US011409779B2

(12) United States Patent
Hou et al.

(10) Patent No.: US 11,409,779 B2
(45) Date of Patent: Aug. 9, 2022

(54) AUTOMATIC EXTRACTION OF A TRAINING CORPUS FOR A DATA CLASSIFIER BASED ON MACHINE LEARNING ALGORITHMS

(71) Applicant: Accenture Global Solutions Limited, Dublin (IE)

(72) Inventors: Fang Hou, Beijing (CN); Yikai Wu, Beijing (CN); Xiaopei Cheng, Beijing (CN); Sifei Ding, Beijing (CN)

(73) Assignee: Accenture Global Solutions Limited, Dublin (IE)

( * ) Notice: Subject to any disclaimer, the term of this patent is extended or adjusted under 35 U.S.C. 154(b) by 261 days.

(21) Appl. No.: 15/977,665

(22) Filed: May 11, 2018

(65) Prior Publication Data

US 2018/0365322 A1  Dec. 20, 2018

Related U.S. Application Data

(63) Continuation of application No. PCT/CN2017/089111, filed on Jun. 20, 2017.

(51) Int. Cl.
*G06F 16/35* (2019.01)
*G06K 9/62* (2022.01)
(Continued)

(52) U.S. Cl.
CPC .......... *G06F 16/353* (2019.01); *G06F 16/374* (2019.01); *G06K 9/628* (2013.01);
(Continued)

(58) Field of Classification Search
CPC .... G06F 16/353; G06F 16/374; G06F 16/285; G06N 20/20; G06N 20/00; G06N 20/10;
(Continued)

(56) References Cited

U.S. PATENT DOCUMENTS

| 7,769,759 B1 | 8/2010 | Gartung et al. |
| 2005/0050075 A1 | 3/2005 | Okamoto et al. |

(Continued)

FOREIGN PATENT DOCUMENTS

| CN | 103608805 A | 2/2014 |
| CN | 104978587 A | 10/2015 |

(Continued)

OTHER PUBLICATIONS

International Search Report and Written Opinion of the International Search Authority dated Mar. 21, 2018 in International Application No. PCT/CN2017/089111 (English language) (9 pp.).

(Continued)

*Primary Examiner* — Cam Y T Truong
(74) *Attorney, Agent, or Firm* — Crowell & Moring LLP

(57) ABSTRACT

An iterative classifier for unsegmented electronic documents is based on machine learning algorithms. The textual strings in the electronic document are segmented using a composite dictionary that combines a conventional dictionary and an adaptive dictionary developed based on the context and nature of the electronic document. The classifier is built using a corpus of training and testing samples automatically extracted from the electronic document by detecting signatures for a set of pre-established classes for the textual strings. The classifier is further iteratively improved by automatically expanding the corpus of training and testing samples in real-time when textual strings in new electronic documents are processed and classified.

15 Claims, 15 Drawing Sheets

(51) Int. Cl.
  *G06N 20/00* (2019.01)
  *G06F 16/36* (2019.01)
  *G06N 20/10* (2019.01)
  *G06N 20/20* (2019.01)
  *G06V 30/40* (2022.01)
  *G06V 30/148* (2022.01)
  *G06V 30/242* (2022.01)
  *G06N 5/00* (2006.01)
  *G06N 5/04* (2006.01)

(52) U.S. Cl.
  CPC .......... *G06K 9/6256* (2013.01); *G06N 20/00* (2019.01); *G06N 20/10* (2019.01); *G06N 20/20* (2019.01); *G06V 30/153* (2022.01); *G06V 30/242* (2022.01); *G06V 30/40* (2022.01); *G06N 5/003* (2013.01); *G06N 5/046* (2013.01)

(58) Field of Classification Search
  CPC ........ G06N 5/003; G06N 5/046; G06N 7/005; G06K 9/6256; G06K 9/628; G06V 30/153; G06V 30/242; G06V 30/40
  See application file for complete search history.

(56) References Cited

U.S. PATENT DOCUMENTS

2008/0281764 A1* 11/2008 Baxter ................. G06K 9/6256
  706/12
2009/0164416 A1* 6/2009 Guha ...................... G06F 16/31
2011/0125747 A1* 5/2011 Gartung ................ G06F 16/353
  707/737
2013/0110498 A1 5/2013 Bekkerman
2015/0199333 A1* 7/2015 Nekhay ................... G06F 40/30
  704/9
2016/0042321 A1* 2/2016 Held .................. G06Q 10/0838
  705/338

FOREIGN PATENT DOCUMENTS

CN  106528874 A  3/2017
WO  WO 2015/187129 A1  12/2015

OTHER PUBLICATIONS

Extended European Search Report for Europe Application No. 17866376.1, dated Oct. 8, 2019, 8 pages.
Anonymous, "Statistical Classification—Wikipedia", Jun. 17, 2017, Retrieved from the Internet at URL: <https://en.wikipedia.org/w/index.php?title=Statistical_classification&oldid=786164476> retrieved on Sep. 26, 2019, 7 pages.
International Preliminary Report on Patentability in Application No. PCT/CN2017/089111 dated Jan. 2, 2020, 6 pages.
Official action issued on European application No. 17866376.1 dated Sep. 11, 2020, 5 pages.
Office Action and Search Report in Application No. 2017800040797, including English translation/summary, dated Jun. 3, 2021, 6 pages.

* cited by examiner

```
00:BAPLIE:BAYPLAN:9:13374778I:13220556-9:20150901I0850' I0::HANJIN
GENEVA::0112W:::20150901:20150902:CNNGB::KRPUS' 11:HJS' 50:YMLUB805936:45G1:F:0420412:::
:0:0:0:0:0:23500.0::YML' 52:CAPRR:PRINCE
RUPERT:CNSHA:SHANGHAI' 50:FCIU9801607:45G1:F:0600586::::0:0:0:0:11800.0::COSCO' 52:CNN
BO:CNNBO:CAPRI:PRINCE
RUPERT1' 50:TCNU6975030.45G1:F:0421182::::0:0:0:0:30000.0::HJS' 52:CAVAN:VANCOUVER:CNS
HA:SHANGHAI:CAVAN:VANCOUVER' 50:FSCU9352228:45G1:F:0421008::::0:0:0:0:28800.0::COSCO'
52:USSEA:SEATTLE:CNSHA:SHANGHAI:CNSHA:SHANGHAI' 50:SEU5060546:45G1:F:0140284::::0:0:0:
0:0:10700.0::HJS' 52:KRPUS:PUSAN:CNSHA:SHANGHAI' 50:HJCU4951823:42G1:E:0520784::::0:0:0:
0:0:3800.0::HJS' 52:CAVAN:VANCOUVER:CNSHA:SHANGHAI' 50:HJCU2045310:22G1:F:0511310:::0:0
:0:0:29500.0::HJS' 52:CAVAN:VANCOUVER' 50:HJS' 52:CAVAN:SHANGHAI:INTUT:TUTICORIN' 50:CBHU7030992:45
G1:F:0180984::::0:0:0:0:12400.0::COSCO' 52:CNNBO:CNNBO:CAPRI:PRINCE
RUPERT1' 50:HJCU4455905:42G1:E:0260988::::0:0:0:0:3800.0::HJS' 52:CAPRR:PRINCE
RUPERT:CNSHA:SHANGHAI' 50:DRYU9615230:45G1:F:0420616::::0:0:0:0:27000.
0::HJS' 52:USSEA:SEATTLE:CNSHA:SHANGHAI' 50:SEGU4252972:45G1:F:0421012::::0:0:0:0:2780
0.0::YML' 52:USSEA:SEATTLE:CNSHA:SHANGHAI:CNSHA:SHANGHAI' 50:MAGU5240035:45G1:F:0300408::
:::0:0:0:0:0:20200.0::COSCO' 52:CNNBO:CNNBO:USSEA:SEATTLE' 50:YMLU4073152:42G1:E:0100106:
```

| Session | chapter | Harmonised System Code | Code Desc |
|---|---|---|---|
| | | | 1. Animals; Live |
| 1 | 1 | 101 | Horses, Asses, Mules And Hinnies; Live |
| 1 | 1 | 10121 | Horses; Live, Pure-bred Breeding Animals |
| 1 | 1 | 101210010 | Horses; Live, Pure-bred Breeding Animals, Thoroughbred, Race Breeding Stock, Stallions |
| 1 | 1 | 101210015 | Horses; Live, Pure-bred Breeding Animals, Thoroughbred, Race Breeding Stock, Mares |
| 1 | 1 | 101210017 | Horses; Live, Pure-bred Breeding Animals, Thoroughbred, Sport Breeding Stock, Excluding Race Breeding Stock, Stallions |
| 1 | 1 | 101210019 | Horses; Live, Pure-bred Breeding Animals, Thoroughbred, Sport Breeding Stock, Excluding Race Breeding Stock, Mares |
| 1 | 1 | 101210023 | Horses; Live, Pure-bred Breeding Animals, Thoroughbred, Breeding Stock, Excluding Race Or Sport Breeding Stock, Stallions |
| 1 | 1 | 101210027 | Horses; Live, Pure-bred Breeding Animals, Thoroughbred, Breeding Stock, Excluding Race Or Sport Breeding Stock, Mares |
| 1 | 1 | 101210031 | Horses; Live, Pure-bred Breeding Animals, Standardbred, Race Breeding Stock, Stallions |
| 1 | 1 | 101210035 | Horses; Live, Pure-bred Breeding Animals, Standardbred, Race Breeding Stock, Mares |
| 1 | 1 | 101210037 | Horses; Live, Pure-bred Breeding Animals, Standardbred, Sport Breeding Stock, Excluding Race Breeding Stock, Stallions |
| 1 | 1 | 101210041 | Horses; Live, Pure-bred Breeding Animals, Standardbred, Sport Breeding Stock, Excluding Race Or Sport Breeding Stock, Stallions |
| 1 | 1 | 101210049 | Horses; Live, Pure-bred Breeding Animals, Standardbred, Breeding Stock, Excluding Race Or Sport Breeding Stock, Mares |
| 1 | 1 | 10129 | Horses; Live, Other Than Pure-bred Breeding Animals |
| 1 | 1 | 101290010 | Horses; Live, Other Than Pure-bred Breeding Animals, For Racing, Thoroughbred, Stallions, Colts, And Geldings |

CARGO DESCRIPTION
HS CODE - 1805.00.00.00 W - 14,000.00 KGS 1220
560 BAGS @ 25 KG NET OPDF 720-11BR COCOA POWDER(ALKALISED) HS CODE - 1805.00.00.00 W - 14,000.00 KGS
830 SACKS OF INDONESIAN BLACKTEAPD STD - 888N.W. - 49,800.00 KGS** FAX- +86-25-57307760221 DAYS FREE TIME ATDESTINATION
830 SACKS OF INDONESIAN BLACKTEAPD STD - 888N.W. - 49,800.00 KGS** FAX- +86-25-57307760221 DAYS FREE TIME ATDESTINATION
4,112 PIECES = 18.4230 M3CONSIST OFSONOKELING E2E, SONOKELINGDECORATIVEPROFILE AND SONOKELING BEAMDALBERGIA LATIFOLIANETT WEIGHT -
18,256.07 KGS"14 DAYS FREE TIME AT PORTOFDESTINATION"* EMAIL-TFSH@163.COM
MEDICAL PRODUCTSINV NO- 783121589, 783121590
MEDICAL PRODUCTSINV NO- 783123235
MEDICAL PRODUCTSINV NO- 783123241
MEDICAL PRODUCTSINV NO- 783123269, 783123270

3 X 40- HC CONTAINER--4314 CARTONSOHO BUTTER COOKIES 908GMX6PCSCOUNTRY OF ORIGIN - MALAYSIASHIPPED ON BOARD - 26/08/2015FREIGHT COLLECT-
3 X 40- HC CONTAINER--4314 CARTONSOHO BUTTER COOKIES 908GMX6PCSCOUNTRY OF ORIGIN - MALAYSIASHIPPED ON BOARD - 26/08/2015FREIGHT COLLECT-
3 X 40- HC CONTAINER--4314 CARTONSOHO BUTTER COOKIES 908GMX6PCSCOUNTRY OF ORIGIN - MALAYSIASHIPPED ON BOARD - 26/08/2015FREIGHT COLLECT-

Figure 12

Overall Statistics

```
              Accuracy : 0.797
                95% CI : (0.7738, 0.8188)
   No Information Rate : 0.1319
   P-Value [Acc > NIR] : < 2.2e-16

Kappa : 0.7779
McNemar's Test P-Value : NA
```

Statistics by Class:

| | Class: 1 | Class: 2 | Class: 3 | Class: 4 | Class: 5 | Class: 6 | Class: 7 | Class: 8 | Class: 9 | Class: 10 | Class: 11 | Class: 12 | Class: 13 | Class: 15 |
|---|---|---|---|---|---|---|---|---|---|---|---|---|---|---|
| Sensitivity | 0.88889 | 0.84615 | 0.636364 | 0.84848 | 0.64865 | 0.74000 | 0.8263 | 1.00000 | 0.97087 | 0.88660 | 0.87778 | 1.00000 | 0.64000 | 0.73034 |
| Specificity | 0.99817 | 0.99500 | 0.999203 | 0.99400 | 0.99186 | 0.96416 | 0.9518 | 0.99921 | 0.99434 | 0.99888 | 0.98980 | 0.99900 | 0.99597 | 0.98356 |
| Pos Pred Value | 0.97959 | 0.90164 | 0.875000 | 0.92308 | 0.70588 | 0.73510 | 0.7225 | 0.66667 | 0.94340 | 0.86869 | 0.86833 | 1.00000 | 0.76190 | 0.79268 |
| Neg Pred Value | 0.99507 | 0.99170 | 0.996820 | 0.98723 | 0.98945 | 0.96802 | 0.9730 | 1.00000 | 0.99741 | 0.99057 | 0.99064 | 1.00000 | 0.99277 | 0.97973 |
| Prevalence | 0.04265 | 0.05134 | 0.008688 | 0.07820 | 0.02923 | 0.11848 | 0.1319 | 0.00158 | 0.08136 | 0.07662 | 0.07109 | 0.00237 | 0.03975 | 0.07030 |
| Detection Rate | 0.03791 | 0.04344 | 0.005529 | 0.06635 | 0.01896 | 0.08768 | 0.1090 | 0.00158 | 0.07899 | 0.06793 | 0.06240 | 0.00237 | 0.02164 | 0.05134 |
| Detection Prevalence | 0.03870 | 0.04818 | 0.006319 | 0.07188 | 0.02686 | 0.11927 | 0.1509 | 0.00237 | 0.08373 | 0.07820 | 0.07188 | 0.00237 | 0.01659 | 0.06477 |
| Balanced Accuracy | 0.94403 | 0.92058 | 0.817783 | 0.92124 | 0.82026 | 0.85208 | 0.8891 | 0.99960 | 0.98286 | 0.93774 | 0.93379 | 1.00000 | 0.81799 | 0.85795 |

| | Class: 16 | Class: 17 | Class: 18 | Class: 20 | Class: 22 | Class: 23 |
|---|---|---|---|---|---|---|
| Sensitivity | 0.74342 | 0.64912 | 0.571429 | 0.63415 | 0.500000 | 0.750000 |
| Specificity | 0.95512 | 0.98346 | 0.998201 | 0.99020 | 0.999208 | 0.999205 |
| Pos Pred Value | 0.69325 | 0.64912 | 0.888889 | 0.68421 | 0.500000 | 0.857143 |
| Neg Pred Value | 0.96464 | 0.98346 | 0.995227 | 0.98779 | 0.999208 | 0.998411 |
| Prevalence | 0.12006 | 0.04502 | 0.011058 | 0.03239 | 0.001579 | 0.006319 |
| Detection Rate | 0.08926 | 0.02923 | 0.006319 | 0.02054 | 0.000799 | 0.004739 |
| Detection Prevalence | 0.12875 | 0.04502 | 0.007109 | 0.03002 | 0.001579 | 0.005529 |
| Balanced Accuracy | 0.84927 | 0.81629 | 0.785315 | 0.81218 | 0.749604 | 0.874603 |

Model predictive accuracy

| Model | Predictive Accuracy |
|---|---|
| Maximum Entropy | 79.70 % |
| Boosting | 75.16 % |
| SVM | 72.20 % |

Figure 13

AUTOMATIC EXTRACTION OF A TRAINING CORPUS FOR A DATA CLASSIFIER BASED ON MACHINE LEARNING ALGORITHMS

CROSS-REFERENCE TO RELATED APPLICATION

The application is a continuation of PCT International Application No. PCT/CN2017/089111, filed on Jun. 20, 2017 with the State Intellectual Property Office of China, designating the Unites States, the entirety of which is incorporated herein by reference.

TECHNICAL FIELD

This disclosure is related to data mining in general and data segmentation and classification in particular.

BACKGROUND

Classification of unsegmented data items may involve two steps. In the first step, the unsegmented data items are parsed using a dictionary. In the second step, the segmented data items are classified using a classifier model established based on various machine learning algorithms. A suitable dictionary and an efficient way to obtain a sufficiently large corpus of training and testing samples for building the classifier model are of utmost importance in improving the predictive accuracy of the resulting classifier for classifying unsegmented data. For example, existing technologies use conventional dictionaries for segmenting text using document segmentation algorithms. Using frequency of words in a conventional dictionary, however, may not reflect actual word usage in the particular type of text to be segmented. Segmentation based on conventional dictionaries may thus be far from accurate. For another example, document classification based on machine learning algorithms requires a corpus of data items pre-labeled with classes. In existing technologies, such a corpus is established via manually evaluating a large amount of data items by a group of human evaluators. Such processes are inefficient and time consuming. As such, a process for automatically creating a corpus for machine learning in data classification in general, and document classification in particular, is lacking. Such a process would enable a highly efficient classifier that can be dynamically improved as more automatically labeled data items are included in the corpus.

BRIEF DESCRIPTION OF THE DRAWINGS

FIG. 9 shows an example unsegmented input document for cargo data processed at a port;

FIG. 10 shows pre-processing of the input document for cargo data of FIG. 9 to extract various data fields including unsegmented strings for cargo description;

FIG. 11 shows an example of pre-established classification system for cargo;

FIG. 12 shows example segmented cargo description strings from an input document;

FIG. 13 shows example results of predictive accuracy of various classier models developed based on various machine learning algorithms;

DETAILED DESCRIPTION

Figure 1:
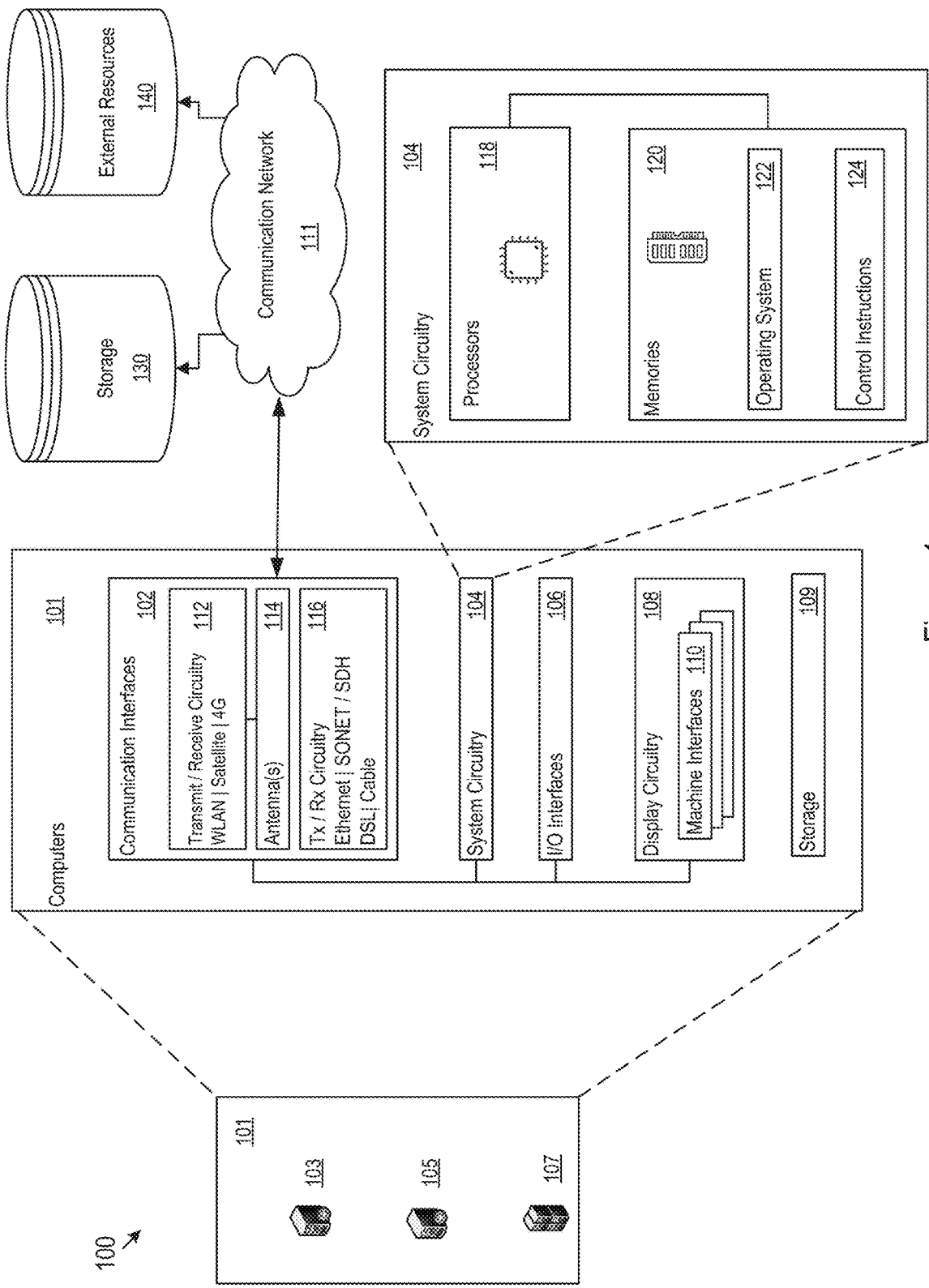
FIG. 1 shows an example computer system for segmenting and classifying unsegmented data items.

A large amount of electronic data, such as text and documents, may be routinely produced in various industrial and commercial settings. Such a text or document, referred to herein simply as a text or alternatively as a document, may be unsegmented in that it contains strings of characters that are not completely parsed into words, phrases, or sentences. Broadly speaking, a character in a text may be a Roman letter, a calligraphic symbol, or any other basic linguistic unit, depending on a specific language used in the text. As an example, a port (such as a seaport) that processes a large amount of cargo or cargo containers may produce, on a daily basis, data about the cargo processing in an Electronic Data Interchange (EDI) format of a particular data organizational standard. For example, each line of an EDI document may be related to one data item corresponding to processing of one cargo container at the port. Each line of the EDI document may contain various data fields specified by the EDI. Some of the unsegmented text fields may be manually entered by port personnel. These manually entered text fields may only loosely comply with some pre-established rules or formats. The text strings entered in these text fields may thus be subject to personnel habit and preference. For example, while a data field specifying a particular destination port of a cargo container may not be subject to much variation with respect to data format and content, a text field describing the characteristics of the cargo may be more of free form, lacking rigorous decoding rules for a computer to determine the type of the cargo. In other words, classification codes for classifying the cargo into a predefined set of classes or categories may not always be embedded in the descriptive text fields.

Classification of these descriptive texts into a pre-established set of classes or categories, however, may be essential for any data services developed based on these routinely produced electronic data. In the example of port cargo processing above, the cargo involved in each data item in an electronic document may need to be classified into one of a predetermined set of cargo classes. Such classification may be achieved using a classifier for the descriptive text for the data items established based on various machine learning algorithms. These machine learning algorithms may include but are not limited to a random forest algorithm (RF), a maximum entropy (ME) algorithm, a boosting algorithm, and a support vector machine (SVM) algorithm. To build a classifier using any of these machine learning algorithms, a sufficiently large corpus of training and testing samples of descriptive texts pre-labeled with the predetermined set of classes must be established first.

Prior to building a classifier and classifying these descriptive texts or strings (used interchangeably) using the classifier, these descriptive strings may need to be segmented into words. Segmentation of these texts based on a conventional dictionary and a word segmentation algorithm, for example, may not be sufficiently accurate for descriptive strings produced in a particular industrial or commercial setting. Particularly, a conventional dictionary may not capture the particular word usage patterns in that particular industrial or commercial setting.

Building a classifier of these descriptive strings is challenging even after the descriptive strings are accurately segmented. In particular, unlike other document classification contexts, i.e., a binary sentiment classification of documents, corpus of training and testing samples typically do not already exist and a manual labeling process of a sufficiently large set of training and testing samples is often time-consuming and unrealistic.

In the disclosure below, a method and system are disclosed generally for segmenting electronic data items and particularly for segmenting text data items based on a composite dictionary. In particular, rather than using a conventional dictionary typically employed in the word segmentation, a composite dictionary combining a conventional dictionary and an adaptive dictionary derived according to some special signatures within the input electronic data items to be segmented is used for segmenting the unsegmented data items. In other words, a conventional dictionary is adaptively modified based on the input data items to form a composite dictionary such that the segmentation becomes more accurate.

In addition, the method and system disclosed include automatically generating a corpus of training and testing samples for building the data classifier model. In particularly, signatures of a set of pre-established classes may be identified in some of the input data items. A signature may be a section of a data item that may be found as a key feature in the classification definition of the set of pre-established classes. The set of pre-established classes may be determined by the contextual information of the input data items. The contextual information may be related to the environment in which the data items are generated. For example, data items generated at a port (i.e. the contextual information) may indicate that the data items are related to cargo. As such, the set of pre-established classes may be based on one or more known official cargo classification systems. A classification system, for example, may include hierarchical codes or text representing classes and or subclasses, and each class or subclass may be associated with a class description and or a subclass description.

A data item with a particular signature is automatically labeled with the corresponding class. The segmented data item having an identified class signature may be included as a sample with the class label into the corpus of training and testing samples for building the classification model. The data items that do not contain any class signature are not labeled and are not included in the corpus of training and testing samples. Once the classifier is established using a machine learning algorithm base on the corpus of training and testing samples, these unlabeled data items may be input into the established classifier mode and be classified and labeled.

The approach of automatic generation of corpus of training and testing samples from the input data items above offers an additional advantage of iteratively improving the cargo classifier. In particular, new input data items may be automatically divided into data items containing class signatures of the predefined set of classes, and data items having no class signatures. The data items having class signatures may be automatically labeled and included into the corpus of training and testing samples. As such, the classifier model may be automatically and iteratively rerun and updated over time using the expanding corpus of training and testing samples and may be iteratively improved as more input data items are processed.

The introduction above and more detailed disclosure below may refer to character string segmentation and text classification from time to time. However, the underlying operative principles apply to segmentation and classification of other data items for which a predefined classification system may be determined. These data items may be used for automatic extraction of a corpus of training and testing samples based on class signatures that may be embedded in these data items. Depending on the context in which these data items are produced and the nature and characteristics of these data items, a suitable conventional or custom-developed machine learning algorithms may be selected for building a classifier model for the classification of these data items.

In FIG. 1, an electronic data classification and modeling system 100 is shown as including a group of computers 101, such as computers 103, 105, and 107. Computers 101 may include communication interfaces 102, system circuitry 104, input/output (I/O) interfaces 106, storage 109, and display circuitry 108 that generates machine interfaces 110 locally or for remote display, e.g., in a web browser running on a local or remote machine. The machine interfaces 110 and the I/O interfaces 106 may include GUIs, touch sensitive displays, voice or facial recognition inputs, buttons, switches, speakers and other user interface elements. Additional examples of the I/O interfaces 106 include microphones, video and still image cameras, headset and microphone input/output jacks, Universal Serial Bus (USB) connectors, memory card slots, and other types of inputs. The I/O interfaces 106 may further include magnetic or optical media interfaces (e.g., a CDROM or DVD drive), serial and parallel bus interfaces, and keyboard and mouse interfaces.

The communication interfaces 102 may include wireless transmitters and receivers ("transceivers") 112 and any antennas 114 used by the transmitting and receiving circuitry of the transceivers 112. The transceivers 112 and antennas 114 may support Wi-Fi network communications, for instance, under any version of IEEE 802.11, e.g., 802.11n or 802.11ac. The communication interfaces 102 may also include wireline transceivers 116. The wireline transceivers 116 may provide physical layer interfaces for any of a wide range of communication protocols, such as any type of Ethernet, data over cable service interface specification (DOCSIS), digital subscriber line (DSL), Synchronous Optical Network (SONET), or other protocol. The computers 101 of the data classification and modeling system 100 may communicate with external storage 130 and external resources 140 via the communication interface 102 and the communication network 111.

The storage 109 and the external storage 130 may be used to store various initial, intermediate, or final data or model for the electronic data classification and modeling system 100. The storage 109 and the external storage 130 may be centralized or distributed. For example, the external storage 130 may be hosted remotely by a cloud computing service provider. The external resources 140 may provide various other data that may be used in building and using the classification model. These external resources may belong to other entities. These resources may not be limited to data. For example, these external resources may include other computing resources including both hardware and software.

The system circuitry 104 may include hardware, software, firmware, or other circuitry in any combination. The system circuitry 104 may be implemented, for example, with one or more systems on a chip (SoC), application specific integrated circuits (ASIC), microprocessors, discrete analog and digital circuits, and other circuitry. The system circuitry 104 is part of the implementation of any desired functionality related to the building, maintenance, and application of the electronic data classification model. As just one example, the system circuitry 104 may include one or more instruction processors 118 and memories 120. The memories 120 stores, for example, control instructions 124 and an operating system 122. In one implementation, the instruction processors 118 executes the control instructions 124 and the operating system 122 to carry out any desired functionality related to the electronic data classification model.

Figure 2:
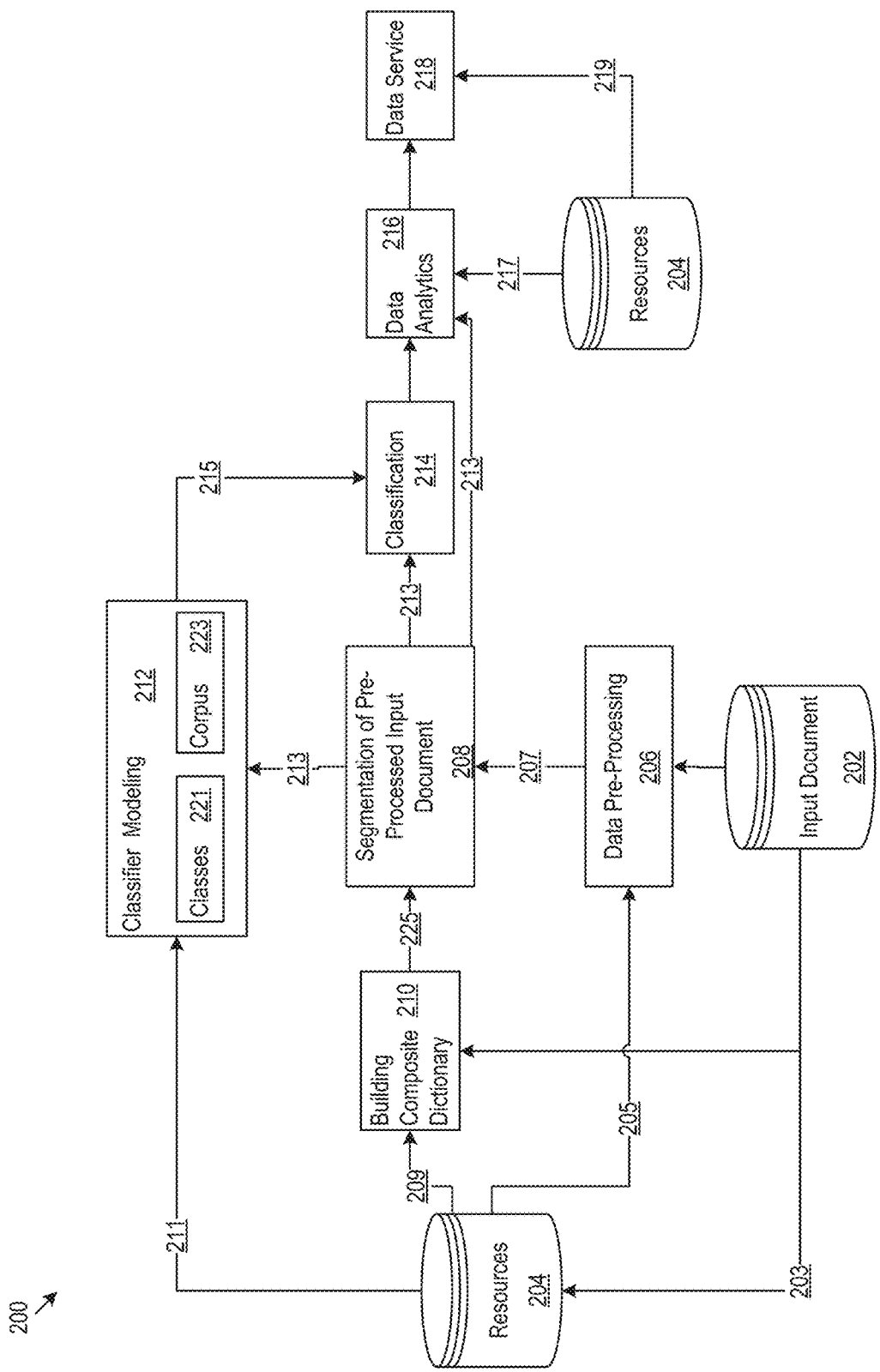
FIG. 2 shows an example logic flow for segmenting and classifying unsegmented data items.

FIG. 2 illustrates an example logic flow 200 for segmenting input electronic data items (referred to simply as data items) in an input electronic document (referred to simply as input document) and classifying each data item into one of a set of predetermined classes. The logic flow 200 may be implemented by the system circuitry 104 of FIG. 1. The logic flow 200 may include obtaining data items from input document 202 to be segmented and classified, and data from external resources 204 (referred to alternatively as resources). The external resources 204 may include various data independent of the input data items that may be used to facilitate segmentation of the input text and classification of the data items in the input document 202. Selection of data from the external resources 204 may be based on the nature and characteristics of the input document 202 derived from the content of the input document, as shown by 203. The logic flow 200 may further include performing pre-processing of the input document 202 to obtain pre-processed document 207, as shown by 206. Document pre-processing 206 may be facilitated by data 205 from the external resources 204.

The logic flow 200 may further include building a composite dictionary 225 for segmenting the input data items, as shown by 210. The composite dictionary 225 may be established based on selected external data 209 from the external resources 204. The selection of the external data 209 for building the composite dictionary 225, again, may be determined at least partially by the nature and characteristics of the input document 203 derived from the content of the input document 202. The logic flow 200 may further include implementing segmentation of the data items in the pre-processed document 207 based on the composite dictionary to obtain a segmented input document 213 containing segmented data items, as shown by 208.

The logic flow 200 may additionally include building a cargo classification model 215 based on a machine learning algorithm using data 211 from external resources 204 for pre-establishing a set of classes 221 and using automatically selected segmented data items from the segmented document input 213 as a corpus of training and testing samples 223, as shown by 212. The selection of segmented data items from the segmented input document 213 into the corpus of training and testing samples 223 and the labeling of the selected data items with the set of classes 221 may be based on class signatures of the pre-established set of classes 221 detected within the segmented data items of the segmented input document 213. The data classifier model 215 may be alternatively referred as the classification model, or a classifier. Once the classifier model 215 is established, it may then be used to classify the segmented data items in the segmented input document 213 that do not include any class signatures, as shown by 214.

The logic flow 200 may further include performing data analytics of the segmented input document 213 once the data items within the document are classified, as shown in 216. In addition, the logic flow 200 may include providing various data services based on the data analytics performed in 216, as shown by 218. Both the implementation of the data analytics 216 and the data services 218 may rely on external data 217 and 219 contained in external resources 204.

FIGS. 3-8 illustrate more details for the logic flow 200 of FIG. 2. FIGS. 3-8 are each shown in three columns separated by two dotted lines. The left columns (300, 400, 430, 500, 600, 700, and 800) show various logic flows. The middle columns (310, 410, 440, 510, 610, 710, and 810) show various external data from the external resources 204 of FIG. 2 that may be used by the logic flows. The right columns (320, 420, 450, 520, 620, 720, and 820) show input and output data and documents of the logic flows. Unless otherwise specified, blocks with rounded corners are used to designate various data, data items, or data structures while blocks with right-angled corners are used to designate logic flow steps.

Figure 3:
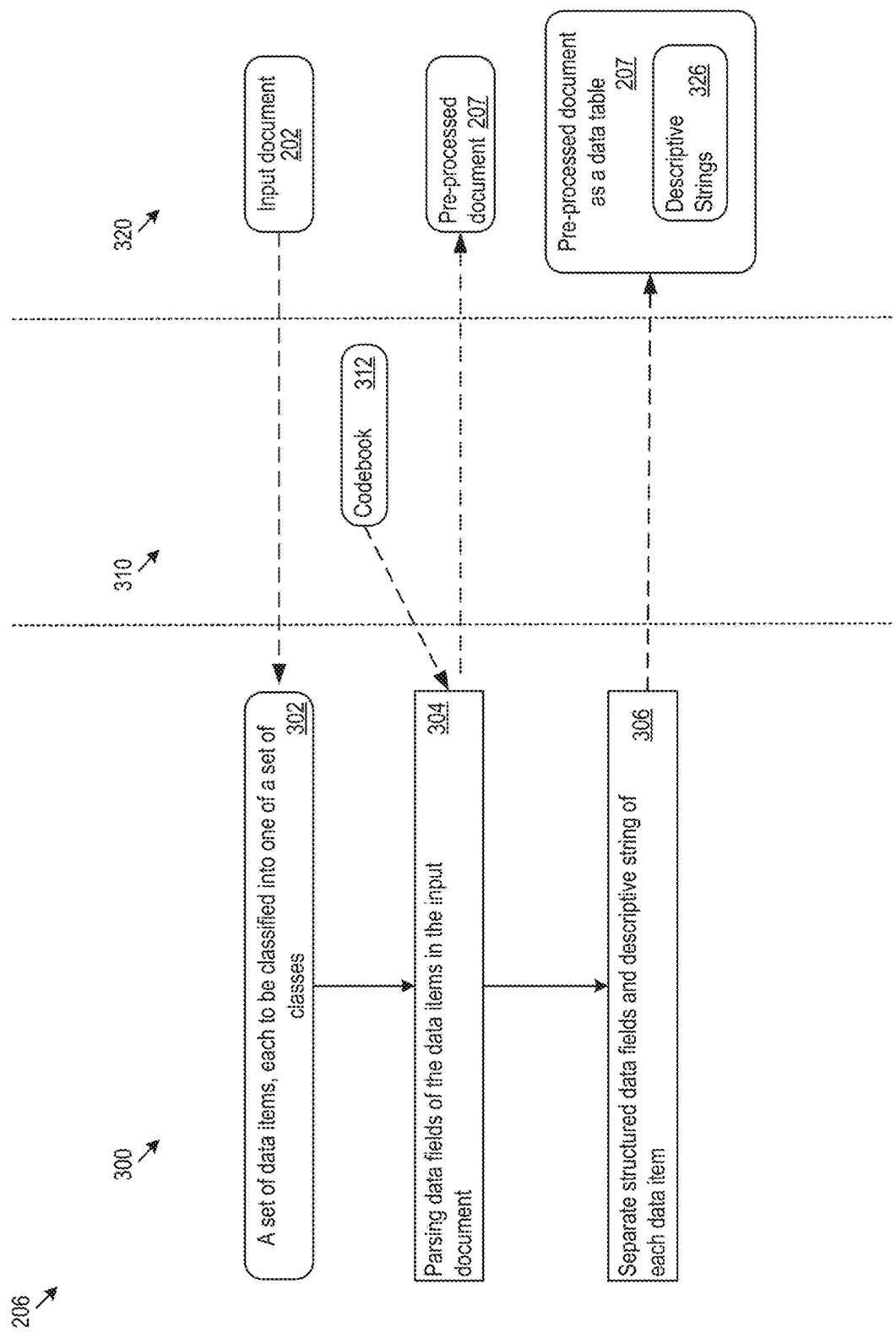
FIG. 3 shows an example logic flow for pre-processing unsegmented data items.

FIG. 3 illustrates an example implementation of the pre-processing of an input document, i.e., logic flow step of 206 of FIG. 2. In FIG. 3, the input document 202 may contain a collection of data items 302 delineated by, for example, carriage return or new-line symbols. Each of the data items 302 may correspond to a subject matter that is to be classified into one of a set of classes. Each of the data items may be encoded, for example, using a pre-defined Electronic Data Interchange (EDI) format. For example, each data item in the input document 202 may contain various data fields. Contents of some of the data fields may be of standard formats. Content of other data fields, e.g., an annotation field, a note field, or a description field, may be of free form. A codebook 312 may be used for parsing various data fields of the data items with EDI format in the input document in logic step 304 to obtain the pre-processed document 207. Data fields with standard formats and data fields with free form contents may be tableted at logic flow step 306. As such, the pre-processed document 207 may be processed into a data table (also referred to as 207). As a result, the annotation, note, or description fields (collectively referred to as descriptive strings may be included in the data table 207 as columns of descriptive strings 326. Each data item of the input document may be associated with a descriptive string. The descriptive strings are to be used as the basis for classifying the data items in the input document 202. The descriptive strings may be unsegmented strings of characters. A character in a descriptive string may be a Roman letter, a calligraphic symbol, or any other basic linguistic unit, depending on a specific language used in the annotation, note, and description field of the input document.

Figure 4:
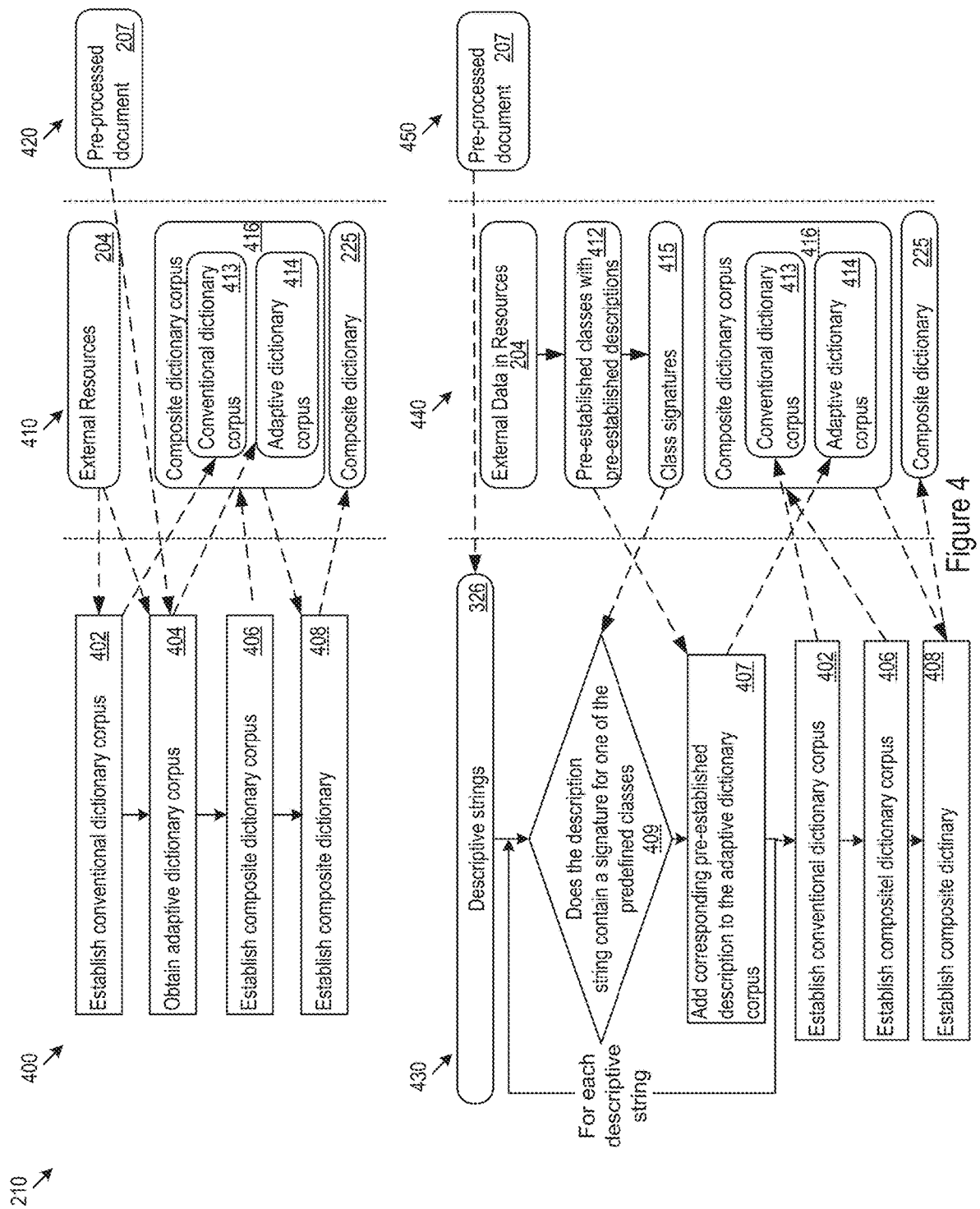
FIG. 4 shows an example logic flow for establishing a composite dictionary for segmenting unsegmented data items.

FIG. 4 illustrates example implementations of step 210 of the logic flow 200 of FIG. 2 for establishing the composite dictionary 225 for segmenting the descriptive strings 326. In one implementation indicated by 400/410/420, the composite dictionary 225 may be developed from a composite dictionary corpus 416. The composite dictionary corpus 416 may contain a conventional dictionary corpus 413 and an adaptive dictionary corpus 414. The conventional dictionary corpus 413 may be based on any normal dictionary corpus for document segmentation. For example, a Tournament Word List (TWL) dictionary corpus used as a conventional dictionary corpus 413. The adaptive dictionary corpus 414 developed based on the nature and context of the input document 202 or pre-processed document 207. For example, if the input document 202 concerns cargo items at a port, then the descriptive texts within a Harmonized System codes (HS codes) for commodity classification at customs may be imported and used as the adaptive dictionary corpus 414. For another example, if the input document 202 is related to data items concerning hazardous materials, descriptions from the Hazardous Material Code Identification system may be imported and used as the adaptive dictionary corpus 414. Correspondingly, the conventional dictionary corpus and adaptive dictionary corpus may be imported and established at logic step 402 and 404. The conventional dictionary corpus and adaptive dictionary corpus may then be combined into the composite dictionary corpus 416 at logic flow step 406. Finally, the composite dictionary 225 may be created based on the composite dictionary corpus 416 at logic flow step 408.

By combining a conventional dictionary corpus 413 and an adaptive dictionary corpus 414 into the composite dictionary corpus 416 and establishing the composite dictionary 225 for segmenting the descriptive strings of the input document, the segmentation accuracy may be improved. In particular, the adaptive dictionary corpus 414 helps capture words used in the particular context of the input document while the conventional dictionary corpus 413 helps capture conventional words that may appear in the descriptive strings of the input document but may not be specific to the particular context of the input document.

The development of composite dictionary from composite dictionary corpus in the logic flow step 408 may involve analyzing the composite dictionary corpus 416 for information concerning, e.g., usage frequency of words. Such information may be incorporated into the composite dictionary 225 by, for example, providing the composite dictionary 225 with words as a list ordered by rankings of usage for the words in the composite dictionary corpus 416.

In another implementation for establishing the composite dictionary 225 as shown by 430/440/450 of FIG. 4, the adaptive dictionary corpus may be more specifically tailored to the input document. For example, the input document may concern a specific context (e.g., cargo data items at a port). As such, a set of classes for the data items in the input document and corresponding description of the set of classes (collectively referred to as 412) may be pre-established from external resources 204 based on the specific context. For example, for an input document concerning cargo items at a port, classification of the cargo items may be pre-established based on the HS classification. Each pre-established HS classification may correspond to a numerical HS code and a standard description of the numerical HS code. Descriptive strings of some of the data items in the input document may already contain numerical HS codes. These numerical HS codes may thus be used as class signatures 415 for the type of cargo items that may be included in the input document. Correspondingly, only the standard descriptions in the HS system for those numerical HS codes identified in the input document may be included in the adaptive dictionary corpus 414, as shown by the logic flow steps 409 and 407. As such, the adaptive dictionary corpus 414 and the resulting composite dictionary 225 may be more specifically tailored to the context of the input document, and thus may provide more accurate segmentation of the descriptive strings of the input document. Other steps such as 402, 408, and 408 are similar to the corresponding steps of the implementation in 400/410/420 of FIG. 4.

Figure 5:
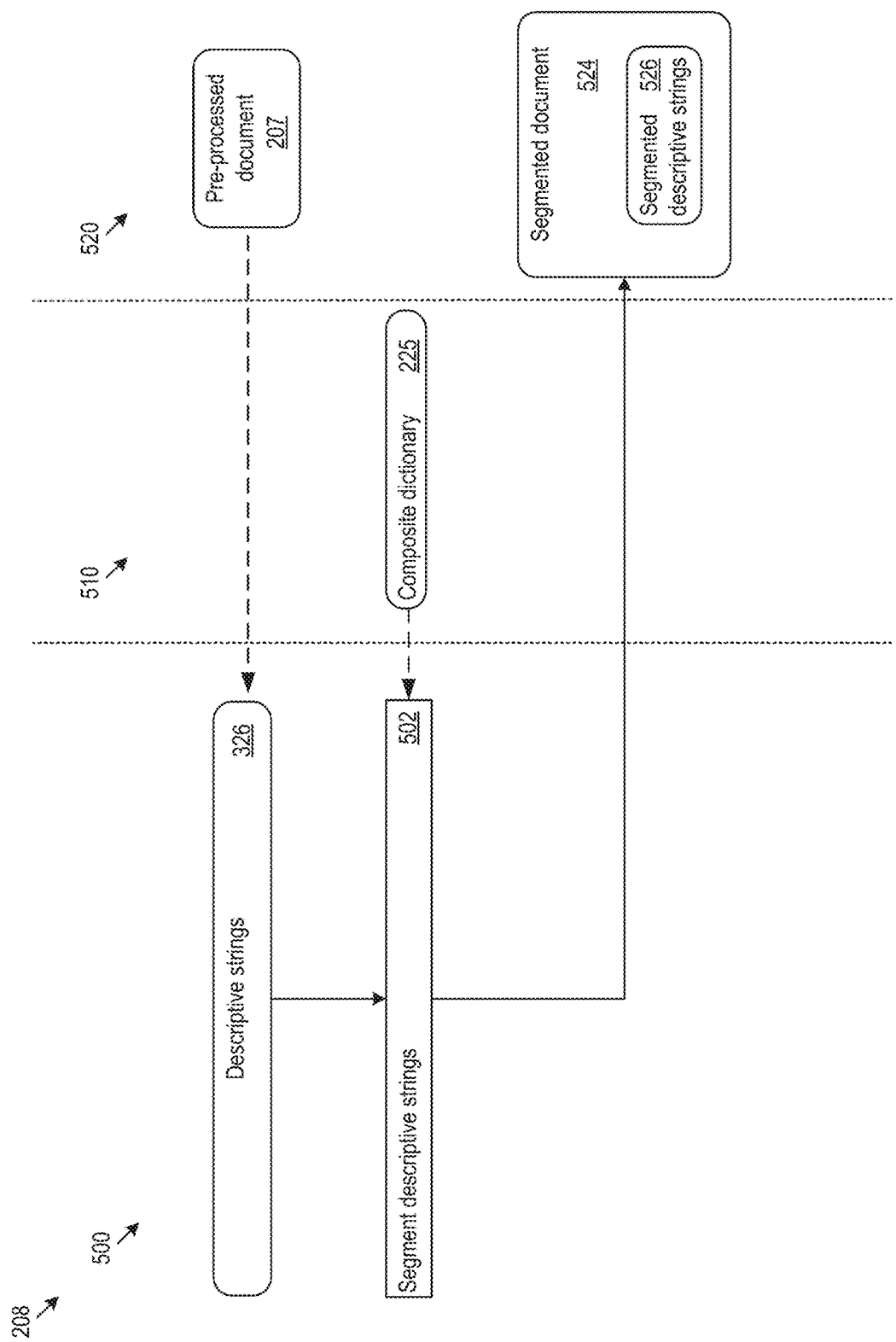
FIG. 5 shows example logic flows for segmenting unsegmented data items using the composite dictionary of FIG. 4.

FIG. 5 illustrates an example implementation of the logic flow step 208 of FIG. 2 for segmenting the pre-processed document 207. In particular, the unsegmented descriptive strings 326 of the data items in the preprocessed document 207 may be extracted. The unsegmented descriptive strings 326 may then be segmented using the composite dictionary 225, as shown by the logic flow step 502. As a result, the pre-processed document or pre-processed data table 207 may be converted into a segmented document (or segmented data table) 524 containing segmented descriptive strings 526.

Segmentation of the descriptive string 326 using the composite dictionary, i.e., the logic flow step 502 of FIG. 5, may be based on, for example, a probabilistic approach. In particular, the composite dictionary may contain a list of words that are ranked by their use frequency in the composite dictionary corpus. In one implementation, the composite dictionary may contain M words. The probability that a word at position m in the composite dictionary may appear in an unsegmented string can be estimated as $$P = \frac{1}{m \, \log(M)}$$

Here, the function log(*) represents natural logarithm. The task of segmenting a descriptive string 326 may be determining a parsing of the descriptive string among numerous possible parsing such that the product of the appearance probabilities of the parsed words is maximized. Because maximizing the product of appearance probabilities of the parsed words is equivalent to minimizing the information entropy of words, this approach may be referred to as minimal entropy segmentation. For example, assume that an input data item contains an unsegmented descriptive string "packagescylinder". Potential breakups of the string are numerous. However, assuming further that the composite dictionary contains four words in the order of: "packages", "cylinder", "pack", and "ages". Breakups containing these words are most likely to have higher product of appearance probabilities. Using the formula above, the probabilities of these four dictionary words appearing in the sequence "packagescylinder" are (0.72, 0.36, 0.24, 0.18). The subset of possible breakups for "packagescylinder" according to the dictionary are "pack ages cylinder" and "packages cylinder". The appearance probability product for the first possible breakup ("pack ages cylinder") is 0.72×0.24×0.18=0.031, while the appearance probability product for the second possible breakup ("packages cylinder") is 0.36*0.18=0.065. As such, according to the minimal entropy approach, the optimal segmentation for the character sequence "packagescylinder" according to the given composite dictionary is "packages cylinder" rather than "pack ages cylinder".

Figure 6:
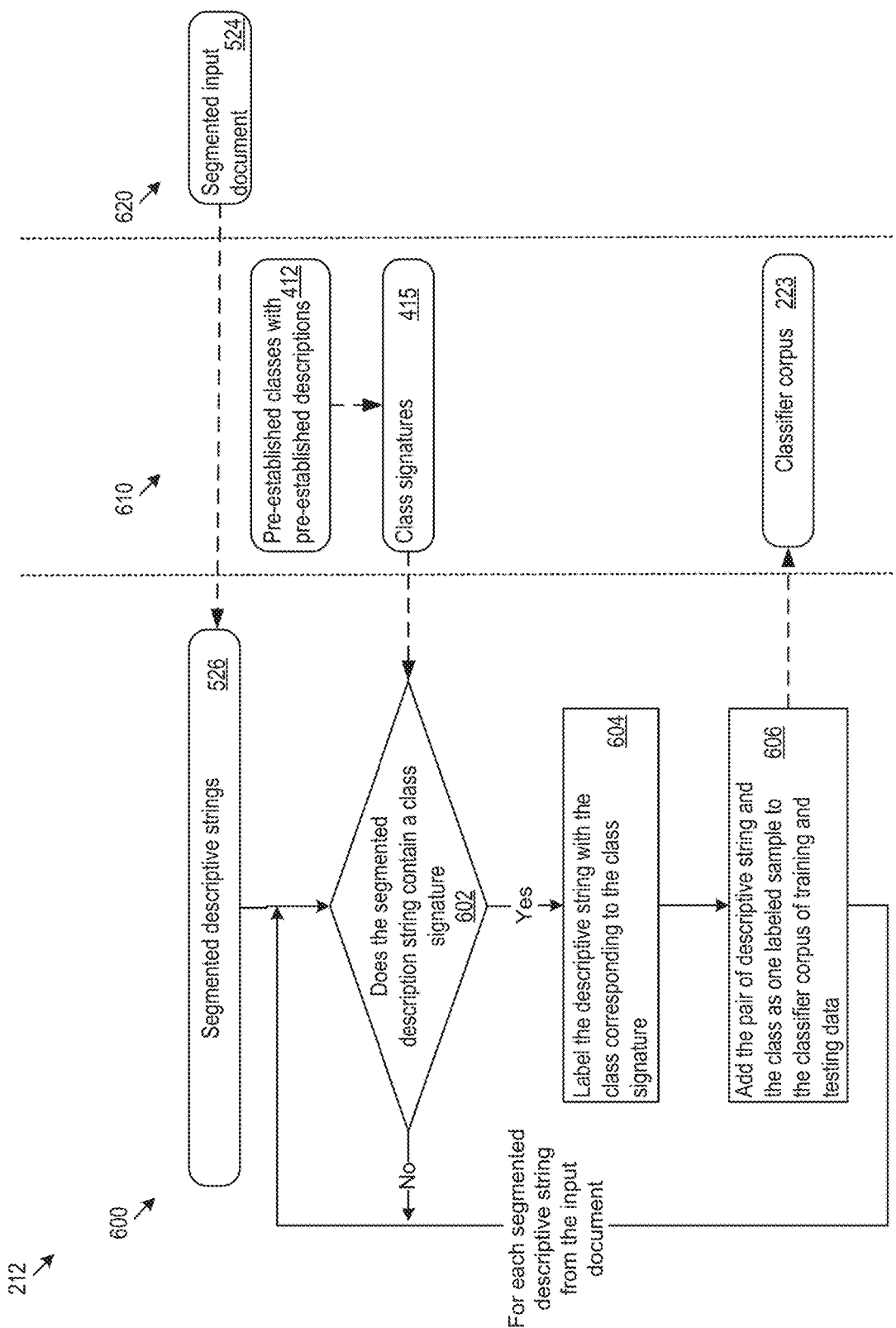
FIG. 6 shows an example logic flow for automatically extracting an initial corpus of training and testing sample for a data classifier by identifying class signatures in input data items.

FIG. 6 shows an example implementation of part the logic flow step 212 for automatically building, from the input document, a corpus of training and testing samples 223 for developing the classifier model for the segmented descriptive strings 526 of the segmented input document 524. Specifically, for descriptive string of each data item in the segmented input document 524, it is determined, in logic flow step 602, whether the descriptive string contains a class signature among the set of class signatures 415 for the pre-established set of classes 412. Similar to FIG. 4, the pre-established set of classes 412 may be determined from the external resources 204 based on the nature and context of the input document. For example, the pre-established set of classes 412 may be based on the HS classification system and each class may be associated with an HS code and a standard HS description of the class, if the input documents concerns cargo data items being processed at a port. The HS codes may be used as the set of class signatures 415.

If a particular descriptive string contains a class signature, then that descriptive string is labeled with the corresponding class, as shown in the logic flow step 604, and is included as one individual sample into the corpus of training and testing samples 223 for developing the classifier model, as shown in the logic flow step of 606. The resulting corpus of training and testing samples 223 may include samples for all the descriptive strings of the input document containing class signatures of the set of pre-established classes. Each descriptive string in the corpus of training and testing samples 223 is paired with a class identifier (e.g., an HS code). By including the actual descriptive strings from the input document rather than the standard descriptions associated with the set of pre-established classes (e.g., HS standard descriptions) from the external resources 204, the corpus of training and testing samples 223 may be more effective and accurate as the main input to the modeling of the classifier based on various machine learning algorithms. This may be because the descriptive strings used in the actual input document in general more accurately reflect the habit and convention used by a particular set of data input personnel in constructing the descriptive strings in the input document. The choice of words and phrases in the actually descriptive strings of a set of input documents (e.g., from a particular port for cargo data) may differ significantly from standard descriptions from the external resources 204 for the set of pre-established classes.

In another alternative implementation not shown in FIG. 6, the corpus of training and testing samples 223 may include samples of the standard descriptive strings from the external resources 204 labeled with corresponding classes (e.g., standard HS descriptive strings labeled with corresponding HS codes), in addition to samples of the descriptive strings from the input document containing class signatures.

Figure 7:
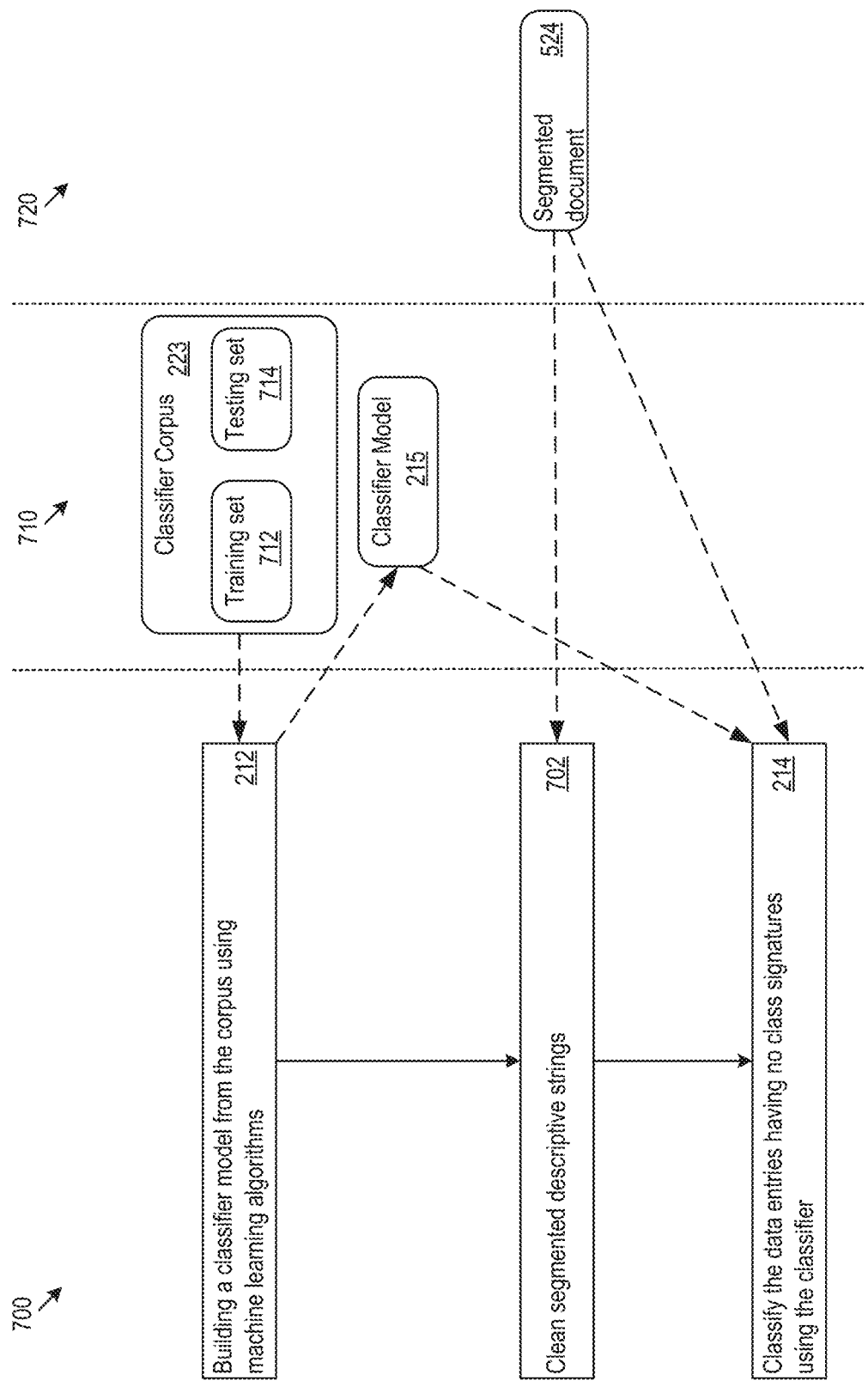
FIG. 7 shows an example logic flow for building a data classifier based on various machine learning algorithms.

FIG. 7 shows an example implementation of another part of the logic flow step 212 for establishing the classifier model 215 for descriptive strings using various machine learning algorithms based on the corpus of training and testing samples 223. Specifically, the corpus of training and testing samples 223 contains samples each being a pair of descriptive string and a class label. The corpus of training and testing samples 223 may be divided into a training sample set 712 and a testing sample set 714. Any suitable machine learning algorithm may be used at the logic flow step 212 for building the classifier model 215. For a typical machine learning algorithm for building a classifier for a descriptive string with unknown class label, a set of features may first be defined and calculated for each sample in the training sample set 712. The classifier model 215 may be represented by a target function of the features of any input descriptive string. The target function may be characterized by a set of parameters. The task of the machine learning algorithm determining the set of parameters based on the features of the samples in the corpus of training and testing samples under a set of constraints. Once the set of parameters are determined, features and target function value of any unlabeled descriptive string may be calculated. The class for the unlabeled descriptive string may be determined according the calculated target function value.

Various machine learning algorithms may differ in the definition or choice of features and the constraints. Example machine learning algorithms may include but are not limited to random forest algorithm (RF), maximum entropy (ME) algorithm, boosting algorithm, and support vector machine (SVM) algorithm. Various machine learning algorithms may be implemented independently and the most effective and accurate classifier model (determined by using the testing sample set 714) may be chosen as the classifier model 215.

A particular machine learning algorithm may be more effective for some contexts but less effective for some other contexts. For example, the ME algorithm may be generally effective for tasks involving document classification and natural language processing. The ME algorithm may be used to build a probabilistic document classifier. The ME algorithm may take into consideration the words and the context information of the words in the corpus training samples. In one implementation, every combination of a word appearing in the corpus of training samples, w, and a possible class c' may instantiate one of the features $f_{w,c'}$ for each descriptive string-class pair:

$$f_{w,c'}(d, c) = \begin{cases} 0, & \text{if } c \neq c' \text{ and } w \text{ appears in } d \\ 1, & \text{otherwise} \end{cases}, \quad (1)$$

or alternatively:

$$f_{w,c'}(d, c) = \begin{cases} 0, & \text{if } c \neq c' \\ \frac{N(d, w)}{N(d)}, & \text{otherwise} \end{cases}, \quad (2)$$

where $N(d,w)$ is the number of times word w occurs in descriptive string d and $N(d)$ is the number of words in d. A model for finding a probability of an unknown descriptive string x being in class y may be define as:

$$p(y \mid x) = \frac{\exp(\Sigma_i \lambda_i f_i(x, y))}{\Sigma_y \exp(\Sigma_i \lambda_i f_i(x, y))} \quad (3)$$

where $\lambda_i$ are the model parameters determined by finding a probability distribution summed over all samples in the corpus of training samples having maximum entropy.

Once the classifier model 215 including the model parameters $\lambda_i$ and feature definition is built using the corpus of training and testing samples 223 and a machine learning algorithm such as the ME algorithm, it may be used in the logic flow step of 214 of FIG. 2 and FIG. 7 to classify segmented descriptive strings in the input document that do not contain any class signature. Optionally, the descriptive strings in the segmented documents may first be cleaned at logic flow step of 702 before being classified. The cleaning of the descriptive strings may include, for example, removing words that do not carry information related to the pre-established classes.

Figure 8:
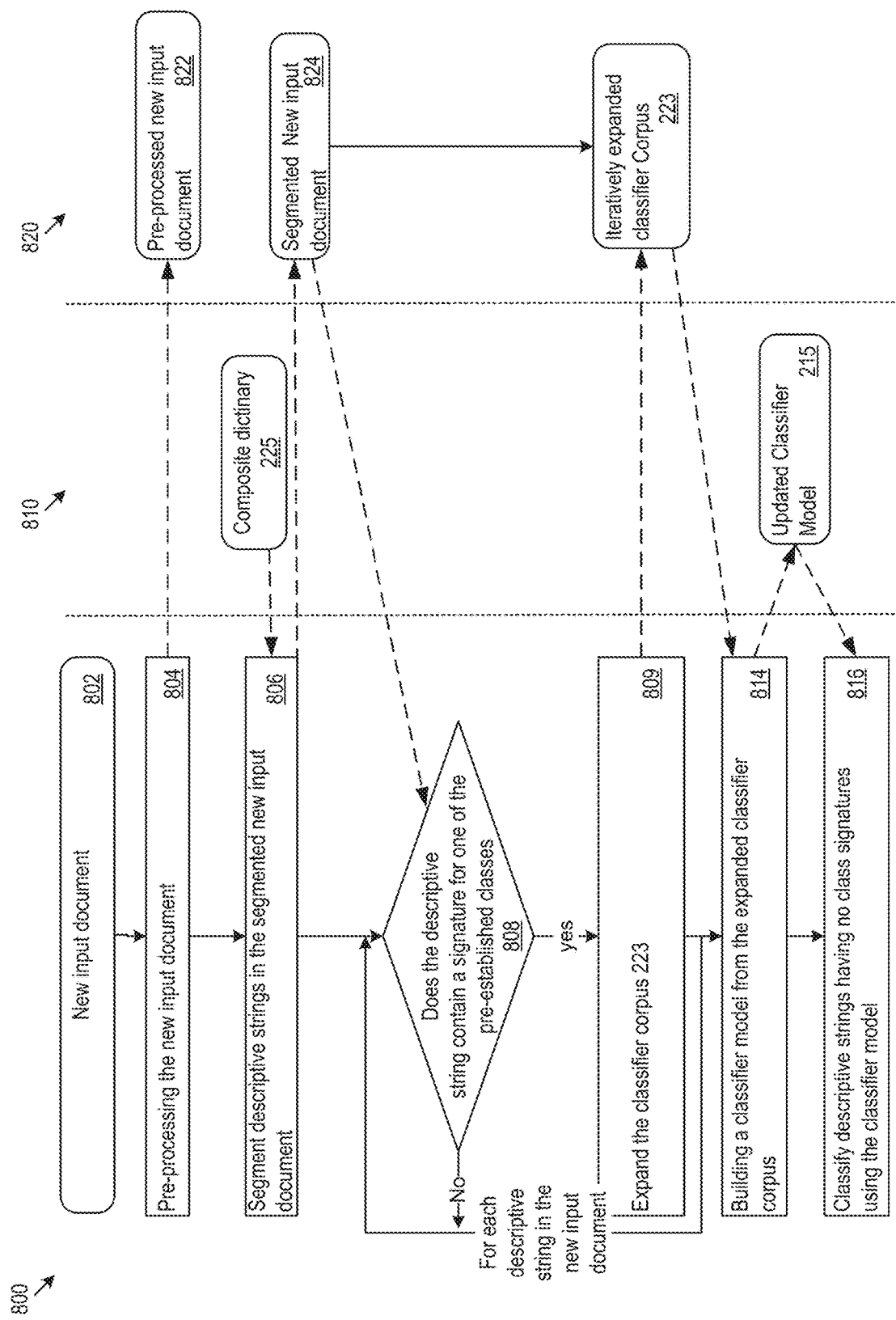
FIG. 8 shows an example logic flow for automatically expanding the corpus of training and testing samples and iteratively updating the classier model.

FIG. 8 illustrates iteratively improving the classifier model 215 using new input documents. Specifically, when a new input document 802 is received, it is pre-processed at logic flow step 804, similar to the pre-processing steps in FIG. 3, to obtain pre-processed new input document 822. The pre-processed new input document 822 is then segmented using the composite dictionary 225 at logic flow step 806 to obtain a segmented new input document 824. The composite dictionary 225 may be the same as that developed in 400/410/420 of FIG. 4. Alternatively, the composite dictionary 225 may be updated by including the new input document following the processes of 430/440/450 of FIG. 4 and the corresponding description.

For each descriptive strings in the segmented new input document 824, it is determined in logic flow step 808 whether the descriptive string contains a class signature of the pre-established classes. If the descriptive string does contain a class signature, the corpus of training and testing samples 223 is iteratively updated by including therein this descriptive string labeled with the corresponding class in logic flow step 809. The iteratively updated corpus of training and testing samples 223 may then be used to rebuild the classifier model in logic flow step 814 following a similar process of FIG. 7 to obtain an iteratively updated classifier model 215. The updated classifier model 215 may then be used to classify descriptive strings having no class signatures, as shown by the logic flow step 816.

In one implementation, the rebuilding of the classifier model may be controlled such that the rebuilding process is not performed excessively. For example, the logic flow step 814 may performed only when the corpus of training and testing samples 223 are expanded to certain extent. In particular, a threshold number may be predefined and the rebuilding of the classifier model 215 may only be performed when the number of new samples added to the corpus of training and testing samples 223 exceeds the predefined threshold number.

The automatic iterative process above is made possible because the samples in the corpus of training and testing samples is automatically extracted from the initial input document or the new input document rather than manually labeled with class signatures. Manually labeled corpus of training and testing samples tend to be static and difficult to update. The iterative process above for automatically updating the corpus of training and testing samples and the classifier itself facilitates improvement of the classifier model over time as new input data is being processed.

The disclosure below further provides an example application of the principles for building a classifier for an input document containing unsegmented data items in the context of cargo data processed (e.g., shipped) at a port. FIG. 9 shows an excerpt of an unsegmented document describing cargo data items. A document such as 902 of FIG. 9 may be collected at the port periodically or continuously, e.g., on a daily basis. The document 902 may be generated using a combination of automated and manual procedures. The document 902 may be compiled following predefined rules. These rules may be reversely followed by the system circuitry 104 of FIG. 1 for automatically pre-processing the data items contained in the document 902 into pre-processed document 207 as shown in FIGS. 2 and 3. For example, the rules for compiling the document 902 may be specified in a codebook. The codebook may be used as a basis for pre-processing the document 902. Example computer codes that may be compiled and then executed by the system circuitry of FIG. 1 for pre-processing document 902 produced following an example codebook is illustrated below:

```
Sys.setlocale("LC_CTYPE","chs")
#TACOAR EDI SPECIFICTION
#READ EDI SPECIFICATION
baplieSpec<-
read.csv("D:/ConnectedPort/ConnectedPorts/EDISpec/BAPLIE.csv",stringsAsFactors =
FALSE,encoding = "utf-8")
#BAPLIE EDI SPECIFICATION
headerRecord<-baplieSpec[baplieSpec$RecordId==0,]$Name
vslVoyFields<-baplieSpec[baplieSpec$RecordId==10,]$Name
vslVoyFieldsDetail Record<-baplieSpec[baplieSpec$RecordId==11,]$Name
containerFieldsRecord<-baplieSpec[baplieSpec$RecordId==50,]$Name
attachedContainer<-baplieSpec[baplieSpec$RecordId==51,]$Name
placeInformation<-baplieSpec[baplieSpec$RecordId==52,]$Name
optDischPortInformation<-baplieSpec[baplieSpec$RecordId==53,]$Name
dangerousCargoInformation<-baplieSpec[baplieSpec$RecordId==54,]$Name
#BAPLIE Decoder Function Definiton
baplieDecoder<-function(myBAPLIE,myfileName){
    myBAPLIE<-gsub(pattern = "\\?:|\\?'",replacement = "-",myBAPLIE)
    myBAPLIE<-gsub(pattern = "\\':",replacement = ":",myBAPLIE)
    myBAPLIE<-strsplit(myBAPLIE,"'50")
    bapleHeader<-myBAPLIE[[1]][1]
    bapleHeader<-strsplit(bapleHeader,"'")
    #initialization of header information
    header_Record<-rep("",length(headerRecord))#00
    vsl_VoyFields<-rep("",length(vslVoyFields))#10
    vsl_VoyFieldsDetailRecord<-rep("",length(vslVoyFieldsDetailRecord))#11
    #header Record Decode
    header_Record<-unlist(strsplit(bapleHeader[[1]][1],":"))[-1] # time format conversion
    #header_Record[6]<-as.character(strptime(header_Record[6], "%Y%m%d"))
    if(length(header_Record)<length(headerRecord)){
        header_Record<-c(header_Record,rep("",length(headerRecord)-
length(header_Record)))
    }
    #Vessel Fields Decode
    vsl_VoyFields<-unlist(strsplit(bapleHeader[[1]][2],":"))[-1]#time format conversion
    vsl_VoyFields[7]<-as.character(strptime(vsl_VoyFields[7],"%Y%m%d"))
    vsl_VoyFields[8]<-as.character(strptime(vsl_VoyFields[8],"%Y%m%d"))
```

```
    if(length(vsl_VoyFields)<length(vslVoyFields)){
       vsl_VoyFields<-c(vsl_VoyFields,rep("",length(vslVoyFields)-length(vsl_VoyFields)))
    }
    #Vessel Detailed Fields Decode
    vsl_VoyFieldsDetailRecord<-unlist(strsplit(bapleHeader[[1]][3],":"))[-1]
    if(length(vsl_VoyFieldsDetailRecord)<length(vslVoyFieldsDetailRecord)){
       vsl_VoyFieldsDetailRecord<-
c(vsl_VoyFieldsDetailRecord,rep("",length(vslVoyFieldsDetailRecord)-
length(vsl_VoyFieldsDetailRecord)))
    }
       #Replace the last record with the one removed the trailer record
    myBAPLIE[[1]][length(myBAPLIE[[1]])]<-
strsplit(myBAPLIE[[1]][length(myBAPLIE[[1]])],"9")[[1]][1]
    #Container Fields Record Decode
    containerRecord<-myBAPLIE[[1]][-1]
    containerRecord<-paste("50",containerRecord,sep="")
    containerRecords<-NULL
    for(i in 1:length(containerRecord)){
# i=2
      #print(i)
      container_FieldsRecord<-rep("",length(containerFieldsRecord))#50
      attached_Container<-rep("",length(attachedContainer))#51 No need to initialize
      place_Information<-rep("",length(placeInformation))#52
      opt_DischPortInformation<-rep("",length(optDischPortInformation))#53
      dangerous_CargoInformation<-rep("",length(dangerousCargoInformation))#54
      #ctnfields<-rep("",length(containerFields))
      #attachedCTN<-rep("",1)
      #placeInfos<-rep("",length(placeInfo))
      #optDischPortInfos<-rep("",length(optDischPortInfo))
   #dangerCargoInfos<-rep("",length(dangerCargoInfo))
      #i=3
      myCTN<-unlist(strsplit(containerRecord[i],"5"))
      for(j in 1:length(myCTN)){
         myCTNInfo<-unlist(strsplit(myCTN[j],":"))
         myId<-as.numeric(myCTNInfo[1])
         if(myId==50){
           container_FieldsRecord=myCTNInfo[2:length(myCTNInfo)]
           if(length(container_FieldsRecord)<length(containerFieldsRecord)){
             container_FieldsRecord<-
c(container FieldsRecord,rep("",length(containerFieldsRecord)-
length(container FieldsRecord)))
           }
         }
         if(myId==1) attached_Container=myCTNInfo[2]
         if(myId==2){
           place_Information=myCTNInfo[2:length(myCTNInfo)]
           if(length(place_Information)<length(placeInformation)){
             place_Information<-c(place_Information,rep("",length(placeInformation)-
length(place_Information)))
           }
         }
         if(myId==3){
           opt_DischPortInformation=myCTNInfo[2:length(myCTNInfo)]
           if(length(opt_DischPortInformation)<length(optDischPortInformation)){
             opt_DischPortInformation<-
c(opt_DischPortInformation,rep("",length(optDischPortInformation)-
length(opt_DischPortInformation)))
           }
         }
         if(myId==4){
           dangerous_CargoInformation=myCTNInfo[2:length(myCTNInfo)]
           if(length(dangerous_CargoInformation)<length(dangerousCargoInformation)){
             dangerous_CargoInformation<-
c(dangerous_CargoInformation,rep("",length(dangerousCargoInformation)-
length(dangerous_CargoInformation)))
           }
         }
      }
      containerRecords<-
rbind(containerRecords,c(container_FieldsRecord,attached_Container,place_Information,
opt_DischPortInformation,dangerous_CargoInformation))
    }
    headerRecords<-cbind(t(header_Record),t(vsl_VoyFields),t(vsl_VoyFieldsDetailRecord))
    headerRecords<-as.data.frame(headerRecords)
    names(headerRecords)<-c(headerRecord,vslVoyFields,vslVoyFieldsDetailRecord)
    containerRecords<-as.data.frame(containerRecords)
    names(containerRecords)<-
c(containerFieldsRecord,attachedContainer,placeInformation,optDischPortInformation,
dangerousCargoInformation)
```

```
#bapleDataList<list(header,vesselField,vesselDetails,containerRecords)
finalFrame<-cbind(headerRecords,containerRecords)
}
```

Figure 10:
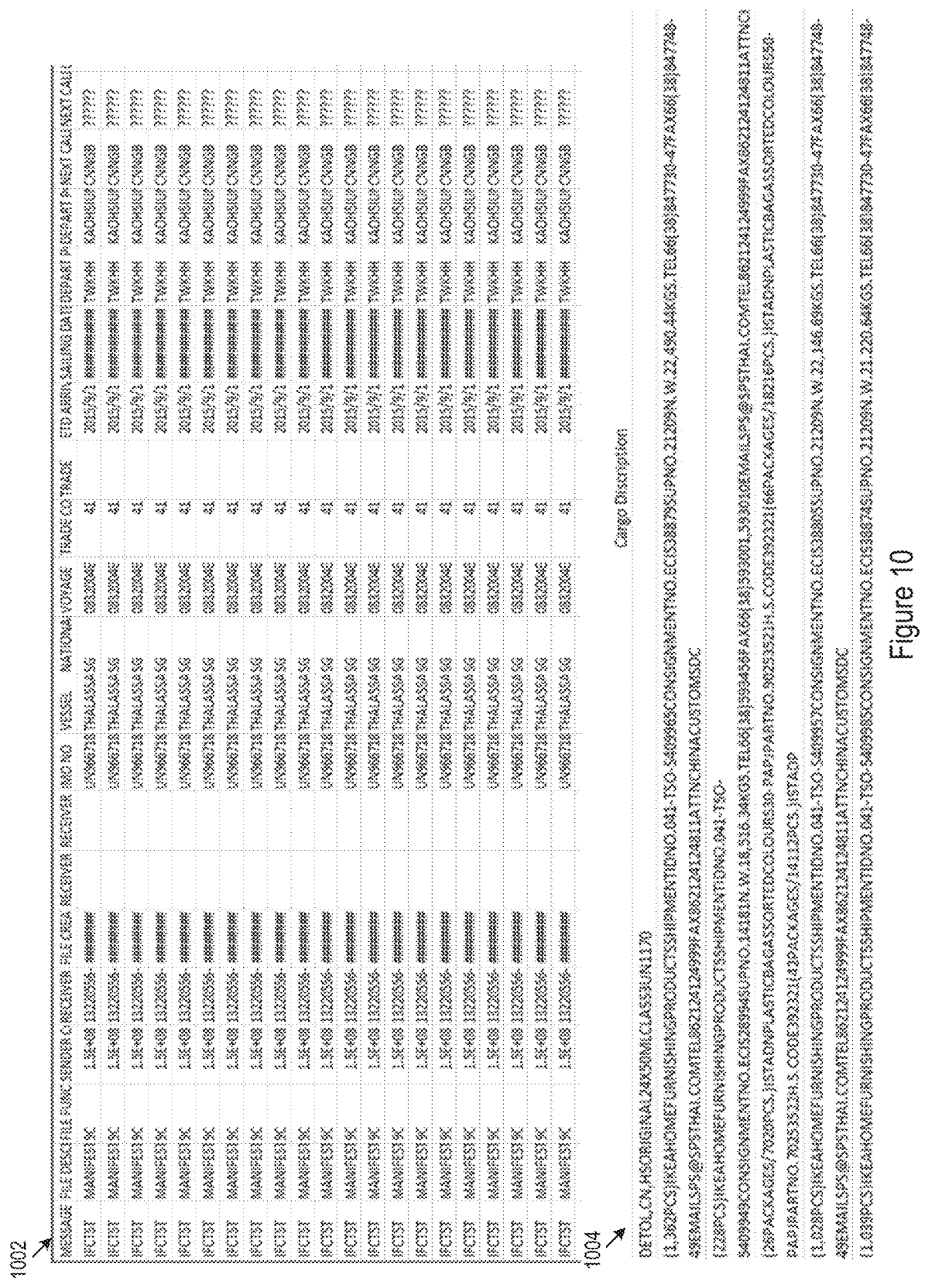

Various data fields in the document 902 may be extracted for each data item using the pre-processing procedure above, as shown in 1002 of FIG. 10. These data fields may include, among others, destination port, vessel related data fields, shippers, receivers, etc. The descriptive string for each cargo data items of the document 902 may also be extracted, as shown by 1004 of FIG. 10 and these descriptive strings may be unsegmented sequence of characters.

FIG. 11 further shows an example excerpt of the HS codes and corresponding HS descriptions. In the Harmonized System, each class of cargo may be identified by a combination of numerical codes including a session number 1110, a chapter number 1120, and an HS code 1130. The session and chapter numbers 1120 may be redundantly included in the HS code 1130. For example, the most significant digit of an HS code 1130 may represent the session number and the second and third most significant digits of the HS code 1130 in combination may represent the chapter code. An HS code may only contain a session number (such as 1150) for defining the entire session. An HS code may contain only a session number and a chapter number (such as 1160) for defining an entire chapter. An HS code may contain various numbers following a session number and a chapter number to define subcategories of cargos, such as the HS codes 1170. As such, the HS code follow the hierarchical model. Further, each class of cargo may be associated with a standard textual description 1140. The HS codes and description of FIG. 11 may constitute part of the external resources 204 of FIG. 2 and middle column of FIGS. 3-8 for determining the pre-established set of classes 412, for determining class signatures, for establishing the composite dictionary 225, and for building the corpus of training and testing samples of training and testing samples 223 automatically from the input document.

For example, the entire collection of standard textual description 1140 for HS may be extracted to form the adaptive dictionary corpus 414 of FIG. 4. This adaptive dictionary corpus, in combination with any conventional dictionary corpus such as a TWL corpus, may form the composite dictionary corpus 416 of FIG. 4. The composite dictionary 225 may then be derived following the procedures descripted in 400/410/420 of FIG. 4. The unsegmented descriptive strings 1004 of FIG. 10 may then be segmented using the composite dictionary following the example procedure descripted in FIG. 5. An example of segmented descriptive strings of the input document is shown as 1210 in FIG. 12.

The HS code of FIG. 11 may be used to determine a pre-established set of classes (412 of FIG. 4) for cargo data items. In one implementation, the pre-established set of classes 412 may simply follow each unique HS code. In other words, each HS code 1130 of FIG. 11 may be pre-established as one of the classes. Alternatively, only the lowest levels of the HS code hierarchy, such as the HS codes in 1170 of FIG. 11 may be pre-established as the set of pre-defined classes.

Signatures of these pre-established classes may appear in some segmented cargo descriptive strings 1210 of FIG. 12. For example, character strings "HS", "HS code" and the like followed by a numerical code may be used as a class signature in the segmented cargo descriptive strings 1210, as the textual description for some of the cargo items may be entered with reference to HS codes. For example, the segmented descriptive string 1220 for the first cargo data item includes "HS Code-1805.00.00.00" 1230, recognizable as containing a signature for HS class 1805.00.00.00. Other descriptive cargo strings in 1210, however, do not contain any class signature.

A segmented descriptive string containing a class signature, such as the segmented descriptive string 1220, may be included into the corpus of training and testing samples as a sample of descriptive string-class pair. Those descriptive strings that do not contain any class signatures, such as the descriptive strings of FIG. 12 other than 1220, may not be included in the corpus of training and testing samples and may be considered descriptive strings with unknown classes.

Classifier models may then be established using various machine learning algorithms based on the corpus of training and testing samples that is automatically derived from the input document. For example, classifier models may be developed independently based on the ME algorithm, the boosting algorithm, and the SVM algorithm. FIG. 13 shows example results of predictive accuracy for these classifiers. In particular, these classifier models are tested using testing samples of descriptive strings labeled with pre-established classes from the corpus of training and testing samples by inputting the testing descriptive strings into the models and compare the predicted classes with the labels. FIG. 13 shows that all classifier models are accurate beyond 70% with the classifier model based on the ME algorithm being most accurate at almost 80%.

Figure 14:
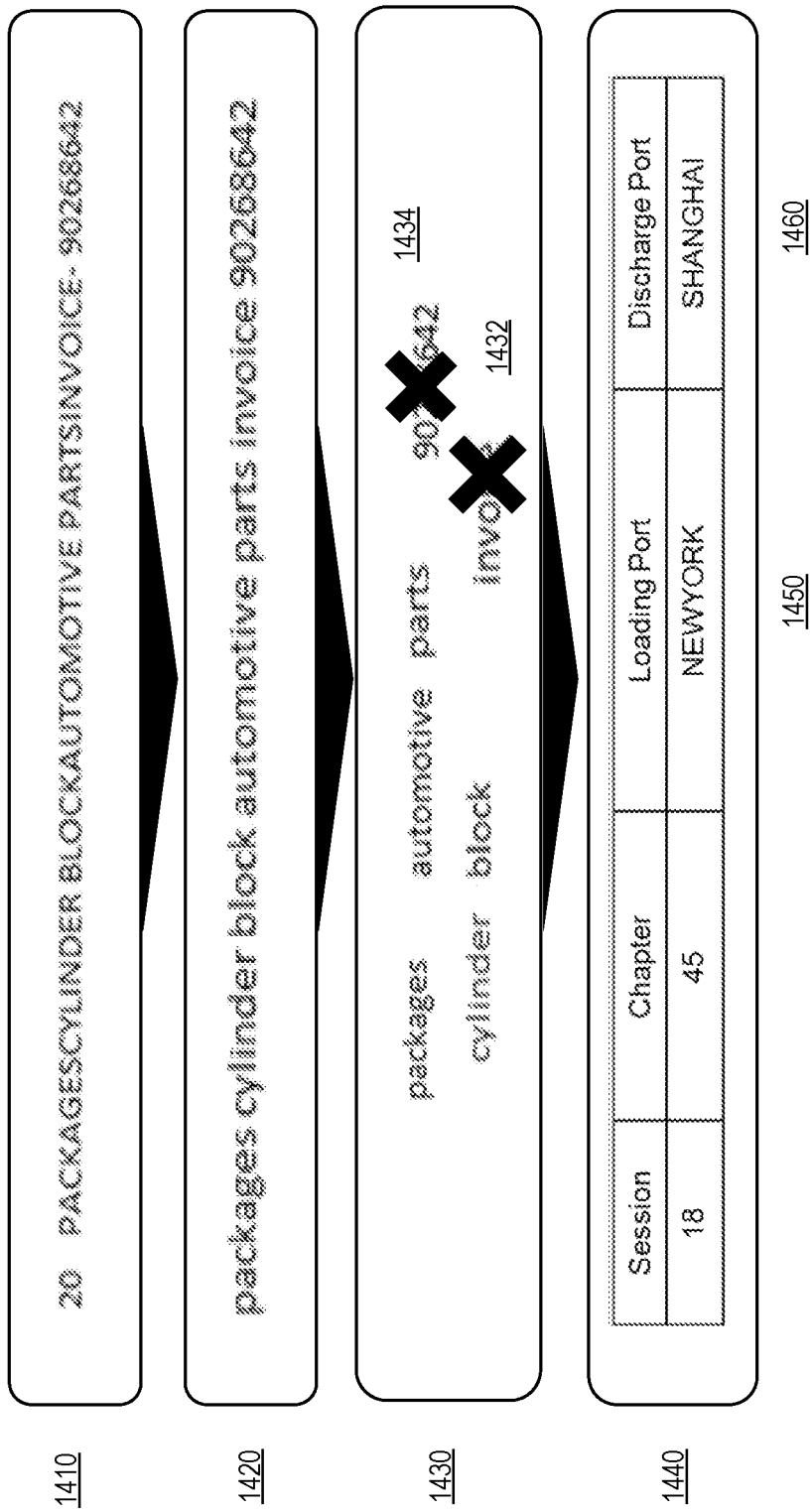
FIG. 14 shows an example unsegmented descriptive string for a cargo item being segmented and classified.

FIG. 14 further illustrates how an example descriptive string of an unknown cargo class is classified by the classifier model based on the ME algorithm. The unsegmented descriptive string for this unknown cargo item is shown by 1410. The corresponding segmented descriptive string is shown by 1420. The effectiveness of the composite dictionary described above may be illustrated by the output for the segmented descriptive string 1420. For example, the words "pack" and "ages" may both be frequently used words in a conventional dictionary. As such, segmentation of "packages" into "pack" and "ages" may provide smaller entropy using the word segmentation algorithm described above, and may thus be deemed as a better segmentation if only the conventional dictionary is used. However, a combination of the conventional dictionary with the adaptive dictionary based on the standard HS descriptions may shift some weight to the word "packages" and enhance its ranking. As a result, keeping the word "packages" as one word may yield smaller entropy when the composite dictionary is used for segmentation. A numerical example in this regard is given above in relation to the logic flow step 502 of FIG. 5.

Continuing with FIG. 14, the segmented descriptive string 1420 may be cleaned to remove irrelevant words, as shown by 1430 and the remaining segmented descriptive string may be used as an input into the classifier model, e.g., based on the ME algorithm, and the corresponding unknown cargo is classified as, e.g., HS18.45, as shown by 1440. Other information not included in the descriptive string (e.g., in other data fields for this data item) may be extracted from the input document, such as the loading port 1450 and discharge port 1460 pre-processed following FIG. 3. For the removal of words before inputting the segmented descriptive string into the classifier model, words such as 1434 and 1432 that play little or no role in determining the cargo class associated with the segmented descriptive string 1420 in the classifier model may be identified and removed. For example, as shown by Equation (3), a λ parameter associated with a feature f may be very small and thus that particular feature may not play much role in determining the probability p(y|x). The word associated with that feature thus may not be important in the classifier model (e.g., numerical word 1434, and financial word 1432 that do not have any indication of cargo classification).

The document segmentation method described above provide improvement in segmentation accuracy by combining a conventional dictionary corpus with an adaptive dictionary corpus in establishing a composite dictionary. Further, the classification method above requires no manual labeling of samples in the corpus of training and testing samples. Rather, the corpus of training and testing samples is automatically extracted from an input document using class signatures. The classification above may thus be iteratively improved by automatically expanding the corpus of training and testing samples and rebuild the classifier model as needed and in real-time.

Figure 15:
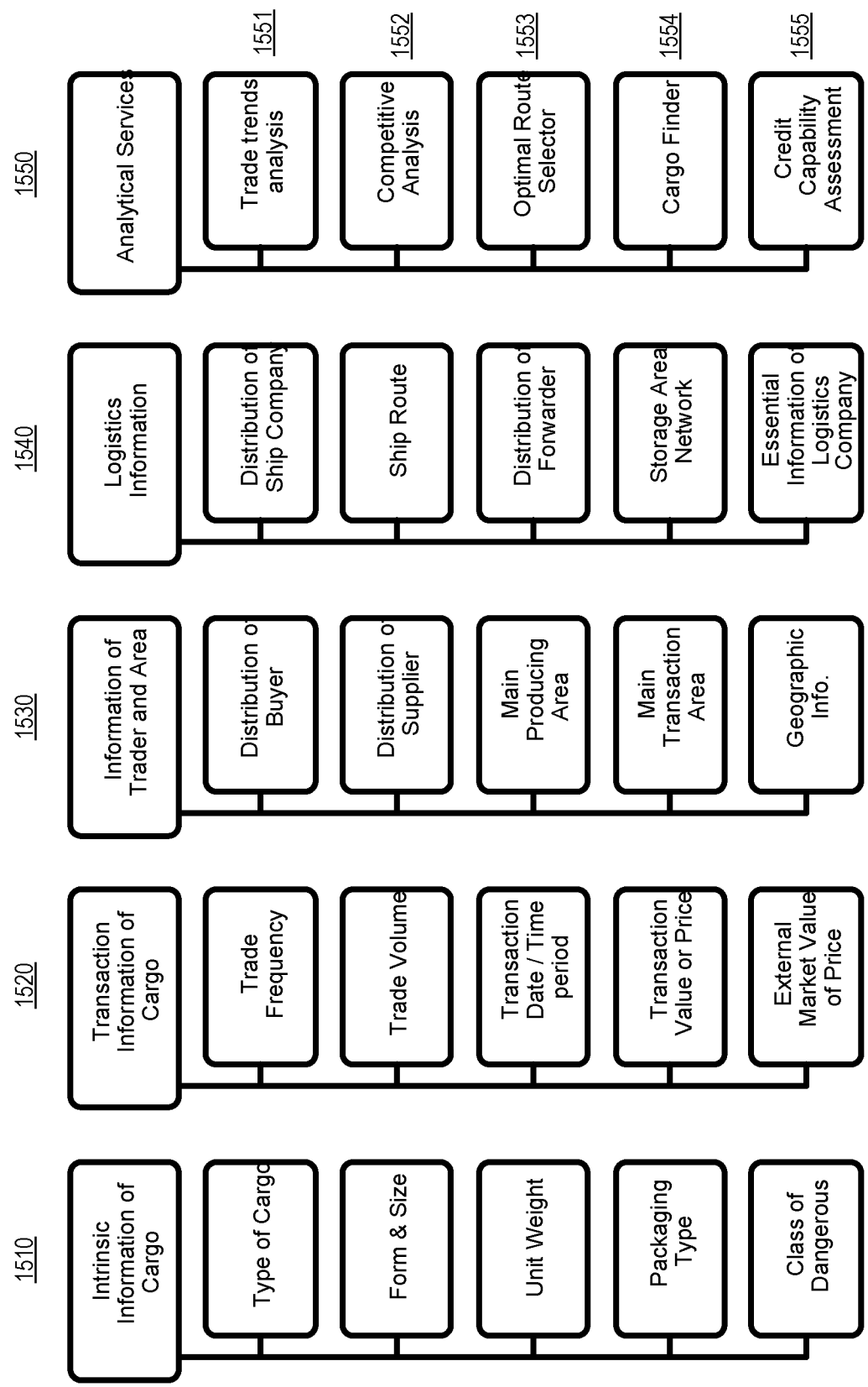
FIG. 15 shows an example service platform based on cargo classification and identification.

Further, an automatic service platform, as shown by 1500 of FIG. 15, may be developed based on the pre-processed data table 207 of FIG. 3, the classification for each cargo item predicted using the classifier model 215 of FIG. 7, in combination with necessary data from the external resources 204 of FIG. 2. For example, intrinsic information 1510 and transaction information 1520 about cargos may be mostly extracted from the structured data fields in the input document during the pre-processing of the input document of FIG. 3. Some of the intrinsic and transaction information about the cargo may alternatively be obtained from external resources 204 of FIG. 4 using the HS classes predicted by the classifier model. Other information such as trader and area information 1530 and logistics information 1540 about cargos may be mainly extracted from various external resources. Analytics may be performed based on the various information above for providing services 1550 related to, for example, trade trends 1551, competitive intelligence 1552, optimal shipping route selection 1553, cargo finder and locator 1554, and credit capability assessment for shippers and merchants of the cargos 1555. The service platform 1500 above is described in the context of cargo shipment.

For example, once a data item of cargo is classified, the classification output may be automatically input into an external data extraction engine. Information shown in FIG. 15 may be obtained. For example, shipping requirements of the cargo may be extracted (e.g., whether the cargo needs to be refrigerated), and capability of various ports for handling the cargo may be extracted. Shipping route, transferring port, type of vessels and the like may be automatically determined. When using a classifier discussed above with the automatically established corpus of training and testing data, the entire process of classification and post-classification data services may be completely automated.

The description above refers to character string segmentation and text classification from time to time. However, the underlying operative principles above apply to segmentation and classification of other data items for which a predefined classification system may be determined. These data items may similarly be used for automatic extraction of a corpus of training and testing samples based on class signatures that may be embedded in these data items. Depending on the context in which these data items are produced and nature and characteristics of these data items, a suitable conventional or custom-developed machine learning algorithms may be selected for building a classifier model for the classification of these data items.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:
1. A data classifier, comprising:
a memory;
a communication interface; and
circuitry in communication with the memory and the communication interface, the circuitry configured to:
acquire, via the communication interface, a plurality of data items;

extract a plurality of data fields, each data field of the plurality of data fields is from one of the plurality of data items;
select, based on contextual information of the plurality of data items, a predefined classification system external to the plurality of data items, the predefined classification system being associated with a set of predefined classes, wherein the set of predefined classes correspond to a set of class signatures and a set of class descriptions;
identify a subset of the plurality of data fields that contains a common identifier present in the set of predefined classes of the predefined classification system;
form a corpus of training and testing samples by extracting, from the subset of the plurality of data fields at least one of the set of class signatures and labeling the subset of the plurality of data fields with the at least one of the set of class signatures, wherein the corpus of training and testing samples comprises pairs of data fields and corresponding labels;
train the data classifier using the corpus of training and testing samples based on a machine learning algorithm;
automatically classify data items of the plurality of data items having data fields that do not contain any class signature using the data classifier;
iteratively acquire a new data item and extract a new data field from the new data item, determine whether the new data item contains the common identifier of the predefined classification system, and expand the corpus of training and testing samples by inserting the new data field as a new sample into the corpus of training and testing samples upon determining that the new data item contains the common identifier of the predefined classification system; and
rebuild the data classifier using the expanded corpus of training and testing samples based on the machine learning algorithm when a number of new samples inserted into the corpus of training and testing samples exceeds a predefined threshold.

2. The data classifier of claim 1, wherein the set of class signatures comprise a set of numerical class signatures, and the set of class descriptions comprise a set of textual class description.

3. The data classifier of claim 1, wherein to extract each data field of the plurality of data fields from one of the plurality of data items, the circuitry is configured to segment each character string of a plurality of character strings in one of the plurality of data items into the plurality of data fields using a dictionary.

4. The data classifier of claim 3, wherein the circuitry is further configured to establish the dictionary from a composite dictionary corpus comprising a conventional dictionary corpus and an adaptive dictionary corpus.

5. The data classifier of claim 4, wherein the circuitry is further configured to obtain the adaptive dictionary corpus from textual descriptions in the predefined classification system external to the plurality of data items.

6. The data classifier of claim 1, wherein the set of class signatures comprise a set of classification codes.

7. The data classifier of claim 1, wherein the machine learning algorithm comprises a probabilistic maximum entropy algorithm.

8. A method for classifying a plurality of data items, comprising:
acquiring, by a processor, the plurality of data items;
extracting a plurality of data fields, wherein each data field of the plurality of data fields is from one of the plurality of data items;
selecting, based on contextual information of the plurality of data items, a predefined classification system external to the plurality of data items, the predefined classification system being associated with a set of predefined classes, wherein the set of predefined classes correspond to a set of class signatures and a set of class descriptions;
identifying, by the processor, a subset of the plurality of data fields that contains a common identifier present in the set of predefined classes of the predefined classification system;
forming, by the processor, a corpus of training and testing samples by extracting, from the subset of the plurality of data fields at least one of the set of class signatures and labeling the subset of the plurality of data fields with the at least one of the set of class signatures, wherein the corpus of training and testing samples comprises pairs of data fields and corresponding labels;
training, by the processor, a data classifier using the corpus of training and testing samples based on a machine learning algorithm;
automatically classifying, by the processor, data items of the plurality of data items having data fields that do not contain any class signature;
iteratively, by the processor, acquiring a new data item and extracting a new data field from the new data item, determining whether the new data item contains the common identifier of the predefined classification system, and expanding the corpus of training and testing samples by inserting the new data field as a new sample into the corpus of training and testing samples upon determining that the new data item contains the common identifier of the predefined classification system; and
rebuilding the data classifier using the expanded corpus of training and testing samples based on the machine learning algorithm when a number of new samples inserted into the corpus of training and testing samples exceeds a predefined threshold.

9. The method of claim 8, wherein the set of class signatures comprise a set of numerical class signatures, and the set of class descriptions comprise a set of textual class description.

10. The method of claim 8, wherein extracting each data field of the plurality of data fields from one of the plurality of data items comprises segmenting a plurality of unsegmented character strings in the plurality of data items into the plurality of data fields using a dictionary.

11. The method of claim 10, wherein the dictionary is established from a composite dictionary corpus comprising a conventional dictionary corpus and an adaptive dictionary corpus.

12. The method of claim 11, wherein the adaptive dictionary corpus is extracted from textual descriptions in the predefined classification system external to the plurality of data items.

13. The method of claim 8, wherein the set of class signatures comprise a set of classification codes.

14. The method of claim 8, wherein the data items comprise cargo items processed by a port, the method further comprising, for one of the classified data item for a cargo item:
- extracting characteristics of the cargo item from an external resource;
- determining a destination of the cargo item;
- selecting a suitable type of container for the cargo item based on the characteristics of the cargo item; and
- automatically determining a route for the cargo item to the destination based on the characteristics of the cargo item.

15. A method for classifying a plurality of data items in an electronic document, comprising:
- acquiring, by a processor, the electronic document containing the plurality of data items;
- extracting, by the processor, a plurality of descriptive character strings from the electronic document corresponding to the plurality of data items;
- selecting, based on contextual information of the plurality of data items, a predefined classification system external to the plurality of data items, the predefined classification system being associated with a set of predefined classes, wherein the set of predefined classes correspond to a set of numerical class signatures and a set of textual class descriptions;
- identifying, by the processor, a subset of a plurality of data fields of the plurality of data items that contain a common identifier present in the set of predefined classes of the predefined classification system;
- obtaining, by the processor, a conventional dictionary corpus;
- deriving, by the processor, an adaptive dictionary corpus from the set of textual class descriptions;
- forming, by the processor, a composite dictionary corpus containing the conventional dictionary corpus and the adaptive dictionary corpus;
- establishing, by the processor, a composite dictionary containing a list of words and usage information of the list of words from the composite dictionary corpus;
- segmenting, by the processor, the plurality of descriptive character strings into a plurality of descriptive texts using the composite dictionary;
- forming, by the processor, a corpus of training and testing samples by extracting, from the plurality of descriptive texts, descriptive texts corresponding to data items of the electronic document that contains at least one of the set of numerical class signatures and labeling the subset of the plurality of data fields with the at least one of the set of numerical class signatures, wherein the corpus of training and testing samples comprises pairs of data fields and corresponding labels;
- training, by the processor, a text classifier using the corpus of training and testing samples based on a probabilistic maximum entropy machine learning algorithm;
- automatically, by the processor, classifying data items of the plurality of data items containing no numerical class signature by inputting the corresponding descriptive texts into the text classifier;
- iteratively, by the processor, acquiring a new data item and extracting a new data field from the new data item, determining whether the new data item contains the common identifier of the predefined classification system, and expanding the corpus of training and testing samples by inserting the new data field as a new sample into the corpus of training and testing samples upon determining that the new data item contains the common identifier of the predefined classification system; and
- rebuilding, by the processor, the text classifier using the expanded corpus of training and testing samples based on the probabilistic maximum entropy machine learning algorithm when a number of new samples inserted into the corpus of training and testing samples exceeds a predefined threshold.

\* \* \* \* \*